United States Patent
Omer

(10) Patent No.: US 12,449,529 B2
(45) Date of Patent: Oct. 21, 2025

(54) UTILIZING SPATIAL MAPS FOR MOTION LOCALIZATION BASED ON MOTION-SENSING DATA DERIVED FROM WIRELESS SIGNALS

(71) Applicant: Cognitive Systems Corp., Waterloo (CA)

(72) Inventor: Mohammad Omer, Waterloo (CA)

(73) Assignee: Cognitive Systems Corp., Waterloo (CA)

( * ) Notice: Subject to any disclaimer, the term of this patent is extended or adjusted under 35 U.S.C. 154(b) by 296 days.

(21) Appl. No.: 18/315,769

(22) Filed: May 11, 2023

(65) Prior Publication Data

US 2024/0377526 A1    Nov. 14, 2024

Related U.S. Application Data

(60) Provisional application No. 63/340,755, filed on May 11, 2022.

(51) Int. Cl.
G01S 13/62       (2006.01)
(52) U.S. Cl.
CPC .................................. *G01S 13/62* (2013.01)
(58) Field of Classification Search
None
See application file for complete search history.

(56) References Cited

U.S. PATENT DOCUMENTS

| | | |
|---|---|---|
| 8,710,984 B2 | 4/2014 | Wilson et al. |
| 9,523,760 B1 | 12/2016 | Kravets et al. |

(Continued)

FOREIGN PATENT DOCUMENTS

| | | |
|---|---|---|
| EP | 3680618 | 7/2020 |
| WO | 2015168700 | 11/2015 |

(Continued)

OTHER PUBLICATIONS

WIPO, International Search Report and Written Opinion issued in Application No. PCT/CA2023/050648 on Aug. 14, 2023, 8 pages.

(Continued)

*Primary Examiner* — Robert W Hodge
*Assistant Examiner* — Helena H Seraydaryan
(74) *Attorney, Agent, or Firm* — Henry Patent Law Firm PLLC

(57) ABSTRACT

A method includes obtaining a set of motion indicator values associated with a time frame. The set of motion indicator values indicating motion detected from wireless links in a wireless communication network during the time frame. The method also includes generating a probability vector comprising values for the connected wireless communication devices and generating spatial coordinates for respective wireless communication devices. The spatial coordinates for each wireless communication device representing a location of the wireless communication device in space. The method also includes modifying the probability vector based on the spatial coordinates of each wireless communication device to generate a modified probability vector representing a probability of motion at the connected wireless communication device during the time frame. The method also includes using the modified probability vector to localize motion relative to the wireless communication device during the time frame.

21 Claims, 12 Drawing Sheets

(56) References Cited

U.S. PATENT DOCUMENTS

| | | |
|---|---|---|
| 9,524,628 B1 | 12/2016 | Omer et al. |
| 9,584,974 B1 | 2/2017 | Omer et al. |
| 9,869,759 B2 | 1/2018 | Furuskog et al. |
| 9,927,519 B1 | 3/2018 | Omer et al. |
| 10,004,076 B1 | 6/2018 | Griesdorf et al. |
| 10,048,350 B1 | 8/2018 | Piao et al. |
| 10,051,414 B1 | 8/2018 | Omer et al. |
| 10,108,903 B1 | 10/2018 | Piao et al. |
| 10,109,167 B1 | 10/2018 | Olekas et al. |
| 10,109,168 B1 | 10/2018 | Devison et al. |
| 10,111,228 B2 | 10/2018 | Griesdorf et al. |
| 10,129,853 B2 | 11/2018 | Manku et al. |
| 10,228,439 B1 | 3/2019 | Olekas et al. |
| 10,264,405 B1 | 4/2019 | Manku et al. |
| 10,318,890 B1 | 6/2019 | Kravets et al. |
| 10,380,856 B2 | 8/2019 | Devison et al. |
| 10,393,866 B1 | 8/2019 | Kravets et al. |
| 10,404,387 B1 | 9/2019 | Devison et al. |
| 10,438,468 B2 | 10/2019 | Olekas et al. |
| 10,459,074 B1 * | 10/2019 | Omer ................. G06N 7/01 |
| 10,459,076 B2 | 10/2019 | Kravets et al. |
| 10,460,581 B1 | 10/2019 | Devison et al. |
| 10,498,467 B1 | 12/2019 | Ravkine |
| 10,499,364 B1 | 12/2019 | Ravkine |
| 10,506,384 B1 | 12/2019 | Omer et al. |
| 10,565,860 B1 | 2/2020 | Omer et al. |
| 10,567,914 B1 | 2/2020 | Omer et al. |
| 10,600,314 B1 | 3/2020 | Manku et al. |
| 10,605,907 B2 | 3/2020 | Kravets et al. |
| 10,605,908 B2 | 3/2020 | Kravets et al. |
| 10,743,143 B1 | 8/2020 | Devison et al. |
| 10,798,529 B1 | 10/2020 | Beg et al. |
| 10,849,006 B1 | 11/2020 | Beg et al. |
| 11,006,245 B2 | 5/2021 | Omer |
| 11,012,122 B1 | 5/2021 | Beg et al. |
| 11,018,734 B1 | 5/2021 | Beg |
| 11,070,399 B1 | 7/2021 | Omer et al. |
| 11,087,604 B2 | 8/2021 | Beg et al. |
| 2012/0146788 A1 | 6/2012 | Wilson et al. |
| 2014/0247179 A1 | 9/2014 | Furuskog |
| 2017/0359804 A1 | 12/2017 | Manku et al. |
| 2018/0270821 A1 | 9/2018 | Griesdorf et al. |
| 2019/0122514 A1 | 4/2019 | Olekas et al. |
| 2019/0146075 A1 | 5/2019 | Kravets et al. |
| 2019/0146076 A1 | 5/2019 | Kravets et al. |
| 2019/0146077 A1 | 5/2019 | Kravets et al. |
| 2019/0147713 A1 | 5/2019 | Devison et al. |
| 2019/0170869 A1 | 6/2019 | Kravets et al. |
| 2019/0384409 A1 | 12/2019 | Omer et al. |
| 2020/0175405 A1 | 6/2020 | Omer et al. |
| 2020/0178033 A1 | 6/2020 | Omer et al. |
| 2020/0264292 A1 | 8/2020 | Kravets et al. |
| 2020/0351576 A1 | 11/2020 | Beg et al. |
| 2020/0351692 A1 | 11/2020 | Beg et al. |
| 2020/0359248 A1 | 11/2020 | Sadeghi et al. |
| 2022/0070710 A1 | 3/2022 | Lim et al. |

FOREIGN PATENT DOCUMENTS

| | | | |
|---|---|---|---|
| WO | 2017106976 | 6/2017 | |
| WO | 2017132765 | 8/2017 | |
| WO | 2017210770 | 12/2017 | |
| WO | 2018094502 | 5/2018 | |
| WO | 2021062552 | 4/2021 | |
| WO | WO-2021062522 A1 * | 4/2021 | ............ G01S 13/56 |

OTHER PUBLICATIONS

Ma, et al., "WiFi Sensing with Channel State Information: A Survey", ACM Comput. Surv., vol. 52, No. 3, Article 46, Jun. 2019, 36 pgs.

Zhang, et al., "Enabling Joint Communication and Radar Sensing in Mobile Networks—A Survey", arXiv:2006.07559v3, Jan. 16, 2021, 32 pgs.

EPO, Extended European Search Report (EESR) issued in Application No. 23802403.8 on Jul. 14, 2025, 7 pages.

* cited by examiner

UTILIZING SPATIAL MAPS FOR MOTION LOCALIZATION BASED ON MOTION-SENSING DATA DERIVED FROM WIRELESS SIGNALS

CROSS-REFERENCE TO RELATED APPLICATIONS

This patent application claims priority to, and incorporates by reference, the entire disclosure of U.S. Provisional Patent Application No. 63/340,755, filed on May 11, 2022.

BACKGROUND

The following description relates to utilizing spatial maps for motion localization based on user input and motion-sensing data derived from wireless signals.

Motion detection systems have been used to detect movement, for example, of objects in a room or an outdoor area. In some example motion detection systems, infrared or optical sensors are used to detect movement of objects in the sensor's field of view. Motion detection systems have been used in security systems, automated control systems, and other types of systems.

DETAILED DESCRIPTION

Figure 1:
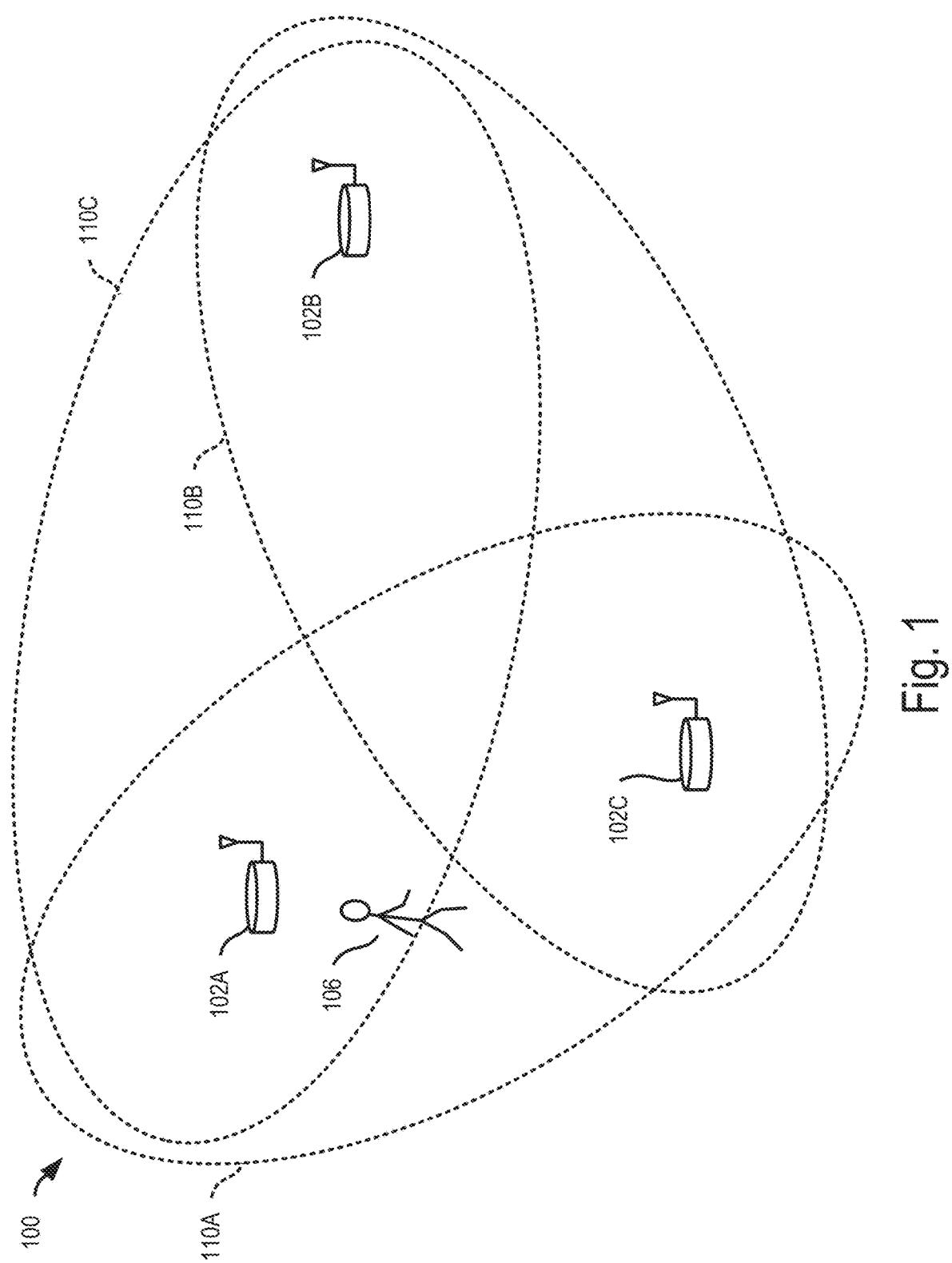
FIG. 1 is a diagram showing an example wireless communication system.

In some aspects of what is described here, a wireless sensing system can process wireless signals (e.g., radio frequency signals) transmitted through a space between wireless communication devices for wireless sensing applications. Example wireless sensing applications include detecting motion, which can include one or more of the following: detecting motion of objects in the space, motion tracking, localization of motion in a space, breathing detection, breathing monitoring, presence detection, gesture detection, gesture recognition, human detection (e.g., moving and stationary human detection), human tracking, fall detection, speed estimation, intrusion detection, walking detection, step counting, respiration rate detection, sleep pattern detection, sleep quality monitoring, apnea estimation, posture change detection, activity recognition, gait rate classification, gesture decoding, sign language recognition, hand tracking, heart rate estimation, breathing rate estimation, room occupancy detection, human dynamics monitoring, and other types of motion detection applications. Other examples of wireless sensing applications include object recognition, speaking recognition, keystroke detection and recognition, tamper detection, touch detection, attack detection, user authentication, driver fatigue detection, traffic monitoring, smoking detection, school violence detection, human counting, metal detection, human recognition, bike localization, human queue estimation, Wi-Fi imaging, and other types of wireless sensing applications. For instance, the wireless sensing system may operate as a motion detection system to detect the existence and location of motion based on Wi-Fi signals or other types of wireless signals.

The examples described herein may be useful for home monitoring. In some instances, home monitoring using the wireless sensing systems described herein may provide several advantages, including full home coverage through walls and in darkness, discreet detection without cameras, higher accuracy and reduced false alerts (e.g., in comparison with sensors that do not use Wi-Fi signals to sense their environments), and adjustable sensitivity. By layering Wi-Fi motion detection capabilities into routers and gateways, a robust motion detection system may be provided.

The examples described herein may also be useful for wellness monitoring. Caregivers want to know their loved ones are safe, while seniors and people with special needs want to maintain their independence at home with dignity. In some instances, wellness monitoring using the wireless sensing systems described herein may provide a solution that uses wireless signals to detect motion without using cameras or infringing on privacy, generates alerts when unusual activity is detected, tracks sleep patterns, and generates preventative health data. For example, caregivers can monitor motion, visits from health care professionals, and unusual behavior such as staying in bed longer than normal. Furthermore, motion is monitored unobtrusively without the need for wearable devices, and the wireless sensing systems described herein offer a more affordable and convenient alternative to assisted living facilities and other security and health monitoring tools.

The examples described herein may also be useful for setting up a smart home. In some examples, the wireless sensing systems described herein use predictive analytics and artificial intelligence (AI), to learn motion patterns and trigger smart home functions accordingly. Examples of smart home functions that may be triggered include adjusting the thermostat when a person walks through the front door, turning other smart devices on or off based on preferences, automatically adjusting lighting, adjusting HVAC systems based on present occupants, etc.

In some aspects of what is described here, a motion detection system includes a plurality of wireless communication devices placed throughout a physical space, such as a residence, a workplace, and so forth. The plurality of wireless communication devices is part of a wireless communication network and may include client devices, such as mobile devices, smartphones, smart watches, tablets, laptop computers, smart thermostats, wireless-enabled cameras, smart TVs, wireless-enabled speakers, wireless-enabled power sockets, and so forth. The plurality of wireless communication devices may also include wireless access points (APs) capable of connecting the client devices to the wireless communication network. In some variations, the plurality of wireless access points defines a wireless mesh network.

During operation, the plurality of wireless communication devices may be associated with respective media access control (MAC) addresses that are unique to each wireless communication device (or wireless communication interface therein). However, the MAC addresses-which are typically represented by pairs of alphanumeric characters-do not indicate positional information such as a location of a wireless communications device in the space or a distance of the wireless communication device relative to another wireless communication device. As such, a user of the motion detection system is unable to perceive the space in which the one or more wireless communication devices reside based on the MAC addresses.

However, the motion detection system may be configured to generate motion-sensing data based on wireless signals exchanged between the plurality of wireless communication devices. The wireless signals may be transmitted across wireless links defined by respective pairs of wireless communication devices in the wireless communication network. Moreover, the wireless links may extend through respective portions of the space. As such, the motion of an object or person in the space may disturb one or more wireless signals and thus allows the motion detection system to generate the motion-sensing data. The motion detection system uses the motion-sensing data to localize the motion of the object or person in the space. In many instances, the motion detection system informs the user where motion is happening in the space by identifying one or more wireless communication devices closest to the motion. Such identification may be made based on a spatial map of the wireless communication devices in the space. The spatial map may assist the user in perceiving the space and motion therein.

The motion detection system may generate the spatial map during an initial period of operation (e.g., a few hours). In doing so, the motion detection system may collect motion-sensing data and then use the collected motion-sensing data to determine the locations of the plurality of communication devices relative to each other. The locations may correspond to physical or logical distances between respective pairs of wireless communication devices. The physical or logical distances may be based on, respectively, a physical or logical coordinate system for the spatial map.

In some implementations, the motion detection system is configured to use the spatial map information to refine or otherwise determine the location of motion detected during operation of the motion detection system. For instance, the spatial map can be used to determine the degree to which each wireless communication device resides in a relatively central location versus an edge of the space, and this determination can be accounted for in a localization process that determines the location of motion in the space. For example, the localization process can be programmed to assign an increased probability of detecting motion near the more centrally located wireless communication devices; in other words, the localization process can be programmed to weight its calculations to account for an increased probability of motion occurring in central locations versus perimeter locations.

In some instances, the motion detection system uses the spatial map to determine an extremity score for each of the wireless communication devices, where the extremity scores represent the degree to which the devices are located in an extremity of a space. Devices that are in a central location will generally have a lower extremity score, while devices that are located closer to the edge or perimeter of a space will generally have a higher extremity score. In some cases, the extremity score for a device can be determined based on the device's connectivity (e.g., the number of wireless links that the device has) in a wireless communication network. In such cases, higher connectivity may be interpreted as an indication of spatial centrality, such that a higher number of wireless links would be associated with a lower extremity score, and a lower number of wireless links would be associated with a higher extremity score. In some cases, the extremity score for a device can be determined based on its distance from neighboring devices in a wireless communication network. In such cases, lower distances may be interpreted as an indication of spatial centrality, such that a lower distance would be associated with a lower extremity score, and higher distance would be associated with a higher extremity score. In some cases, the extremity score can be computed based on distance, connectivity and other information that can be extracted from a spatial map of the wireless communication devices in the space. This connectivity refers to the connectivity of a spanning tree. Once the devices are positioned on the map as described, they are connected them using a spanning tree. which is shown by way of example in FIG. 3C. This spanning tree is just based on the distances between devices. The lines in FIG. 3C do not represent a wireless link. But rather a spanning tree link.

In some instances, aspects of the systems and techniques described here provide technical improvements and advantages over existing approaches. For example, the systems and techniques allow a motion sensing system to account for the relative locations of wireless communication devices when determining the location of motion. The relative centrality of wireless communication devices can be determined from a spatial map of the devices and used to improve accuracy of the localization process. For example, a probabilistic localization process may bias calculations toward detecting motion in locations that are more likely to experience motion (e.g., more central locations in a space), so that the localization process more accurately represents the typical or expected patterns of motion in the space. The technical improvements and advantages achieved in examples where the wireless sensing system is used for motion detection may also be achieved in other examples where the wireless sensing system is used for other wireless sensing applications.

In some instances, a wireless sensing system can be implemented using a wireless communication network. Wireless signals received at one or more wireless communication devices in the wireless communication network may be analyzed to determine channel information for the different communication links (between respective pairs of wireless communication devices) in the network. The channel information may be representative of a physical medium that applies a transfer function to wireless signals that traverse a space. In some instances, the channel information includes a channel response. Channel responses can characterize a physical communication path, representing the combined effect of, for example, scattering, fading, and power decay within the space between the transmitter and receiver. In some instances, the channel information includes beamforming state information (e.g., a feedback matrix, a steering matrix, channel state information (CSI), etc.) provided by a beamforming system. Beamforming is a signal processing technique often used in multi antenna (multiple-input/multiple-output (MIMO)) radio systems for directional signal transmission or reception. Beamforming can be achieved by operating elements in an antenna array in such a way that signals at particular angles experience constructive interference while others experience destructive interference.

The channel information for each of the communication links may be analyzed by one or more motion detection algorithms (e.g., running on a hub device, a client device, or other device in the wireless communication network, or on a remote device communicably coupled to the network) to detect, for example, whether motion has occurred in the space, to determine a relative location of the detected motion, or both. In some aspects, the channel information for each of the communication links may be analyzed to detect whether an object is present or absent, e.g., when no motion is detected in the space.

In some instances, a motion detection system returns motion data. In some implementations, motion data is a result that is indicative of a degree of motion in the space, the location of motion in the space, a time at which the motion occurred, or a combination thereof. In some instances, motion data may include data representing a position of the one or more wireless communication devices relative to each other. For example, the data may represent a distance between pairs of wireless communication devices in the wireless communication network. The distance may be based on a physical or logical coordinate system. In the latter case, the logical coordinate system may be used to indicate distances other than physical distances. A physical distance is something based on metric or other measurement coordinates. For example, device A is 2 meters away from device B. A logical system, or synthetic coordinate system, can be designed to show certain relationships between devices. For example, device A is closer to B, than it is to C. In this type of synthetic coordinate system, the relative placement of devices with respect to each other is emphasized without inferring the exact physical distances between them. This is the kind of logical coordinate system that the described method is trying to build. In some instances, the motion data can include a motion score, which may include, or may be, one or more of the following: a scalar quantity indicative of a level of signal perturbation in the environment accessed by the wireless signals; an indication of whether there is motion; an indication of whether there is an object present; or an indication or classification of a gesture performed in the environment accessed by the wireless signals.

In some implementations, the motion detection system can be implemented using one or more motion detection algorithms. Example motion detection algorithms that can be used to detect motion based on wireless signals include the techniques described in U.S. Pat. No. 9,523,760 entitled "Detecting Motion Based on Repeated Wireless Transmissions," U.S. Pat. No. 9,584,974 entitled "Detecting Motion Based on Reference Signal Transmissions," U.S. Pat. No. 10,051,414 entitled "Detecting Motion Based On Decompositions Of Channel Response Variations," U.S. Pat. No. 10,048,350 entitled "Motion Detection Based on Groupings of Statistical Parameters of Wireless Signals," U.S. Pat. No. 10,108,903 entitled "Motion Detection Based on Machine Learning of Wireless Signal Properties," U.S. Pat. No. 10,109,167 entitled "Motion Localization in a Wireless Mesh Network Based on Motion Indicator Values," U.S. Pat. No. 10,109,168 entitled "Motion Localization Based on Channel Response Characteristics," U.S. Pat. No. 10,743,143 entitled "Determining a Motion Zone for a Location of Motion Detected by Wireless Signals," U.S. Pat. No. 10,605,908 entitled "Motion Detection Based on Beamforming Dynamic Information from Wireless Standard Client Devices," U.S. Pat. No. 10,605,907 entitled "Motion Detection by a Central Controller Using Beamforming Dynamic Information," U.S. Pat. No. 10,600,314 entitled "Modifying Sensitivity Settings in a Motion Detection System," U.S. Pat. No. 10,567,914 entitled "Initializing Probability Vectors for Determining a Location of Motion Detected from Wireless Signals," U.S. Pat. No. 10,565,860 entitled "Offline Tuning System for Detecting New Motion Zones in a Motion Detection System," U.S. Pat. No. 10,506,384 entitled "Determining a Location of Motion Detected from Wireless Signals Based on Prior Probability," U.S. Pat. No. 10,499,364 entitled "Identifying Static Leaf Nodes in a Motion Detection System," U.S. Pat. No. 10,498,467 entitled "Classifying Static Leaf Nodes in a Motion Detection System," U.S. Pat. No. 10,460,581 entitled "Determining a Confidence for a Motion Zone Identified as a Location of Motion for Motion Detected by Wireless Signals," U.S. Pat. No. 10,459,076 entitled "Motion Detection based on Beamforming Dynamic Information," U.S. Pat. No. 10,459,074 entitled "Determining a Location of Motion Detected from Wireless Signals Based on Wireless Link Counting," U.S. Pat. No. 10,438,468 entitled "Motion Localization in a Wireless Mesh Network Based on Motion Indicator Values," U.S. Pat. No. 10,404,387 entitled "Determining Motion Zones in a Space Traversed by Wireless Signals," U.S. Pat. No. 10,393,866 entitled "Detecting Presence Based on Wireless Signal Analysis," U.S. Pat. No. 10,380,856 entitled "Motion Localization Based on Channel Response Characteristics," U.S. Pat. No. 10,318,890 entitled "Training Data for a Motion Detection System using Data from a Sensor Device," U.S. Pat. No. 10,264,405 entitled "Motion Detection in Mesh Networks," U.S. Pat. No. 10,228,439 entitled "Motion Detection Based on Filtered Statistical Parameters of Wireless Signals," U.S. Pat. No. 10,129,853 entitled "Operating a Motion Detection Channel in a Wireless Communication Network," U.S. Pat. No. 10,111,228 entitled "Selecting Wireless Communication Channels Based on Signal Quality Metrics," and other techniques.

FIG. 1 illustrates an example wireless communication system 100. The wireless communication system 100 may perform one or more operations of a motion detection system. The technical improvements and advantages achieved from using the wireless communication system 100 to detect motion are also applicable in examples where the wireless communication system 100 is used for another wireless sensing application.

The example wireless communication system 100 includes three wireless communication devices 102A, 102B, 102C. The wireless communication devices 102A, 102B, and 102C are referred to collectively herein as wireless communication devices 102. The example wireless communication system 100 may include additional wireless communication devices 102 and/or other components (e.g., one or more network servers, network routers, network switches, cables, or other communication links, etc.).

The example wireless communication devices 102A, 102B, 102C can operate in a wireless network, for example, according to a wireless network standard or another type of wireless communication protocol. For example, the wireless network may be configured to operate as a Wireless Local Area Network (WLAN), a Personal Area Network (PAN), a metropolitan area network (MAN), or another type of wireless network. Examples of WLANs include networks configured to operate according to one or more of the 802.11 family of standards developed by IEEE (e.g., Wi-Fi networks), and others. Examples of PANs include networks that operate according to short-range communication standards (e.g., BLUETOOTH®, Near Field Communication (NFC), ZigBee), millimeter wave communications, and others.

In some implementations, the wireless communication devices 102A, 102B, 102C may be configured to communicate in a cellular network, for example, according to a cellular network standard. Examples of cellular networks include: networks configured according to 2G standards such as Global System for Mobile (GSM) and Enhanced Data rates for GSM Evolution (EDGE) or EGPRS; 3G standards such as Code Division Multiple Access (CDMA), Wideband Code Division Multiple Access (WCDMA), Universal Mobile Telecommunications System (UMTS), and Time Division Synchronous Code Division Multiple Access (TD-SCDMA); 4G standards such as Long-Term Evolution (LTE) and LTE-Advanced (LTE-A); 5G standards, and others.

In some cases, one or more of the wireless communication devices 102 is a Wi-Fi access point or another type of wireless access point (WAP). In some cases, one or more of the wireless communication devices 102 is an access point of a wireless mesh network, such as, for example, a commercially-available mesh network system (e.g., GOOGLE® Wi-Fi, EERO® mesh, etc.). In some instances, one or more of the wireless communication devices 102 can be implemented as wireless access points (APs) in a mesh network, while the other wireless communication device(s) 102 are implemented as leaf devices (e.g., mobile devices, smart devices, etc.) that access the mesh network through one of the APs. In some cases, one or more of the wireless communication devices 102 is a mobile device (e.g., a smartphone, a smart watch, a tablet, a laptop computer, etc.), a wireless-enabled device (e.g., a smart thermostat, a Wi-Fi enabled camera, a smart TV), or another type of device that communicates in a wireless network.

In the example shown in FIG. 1, the wireless communication devices transmit wireless signals to each other over wireless communication links (e.g., according to a wireless network standard or a non-standard wireless communication protocol), and the wireless signals communicated between the devices can be used as motion probes to detect motion of objects in the signal paths between the devices. In some implementations, standard signals (e.g., channel sounding signals, beacon signals), non-standard reference signals, or other types of wireless signals can be used as motion probes.

In the example shown in FIG. 1, the wireless communication link between the wireless communication devices 102A, 102C can be used to probe a first motion detection zone 110A, the wireless communication link between the wireless communication devices 102B, 102C can be used to probe a second motion detection zone 110B, and the wireless communication link between the wireless communication device 102A, 102B can be used to probe a third motion detection zone 110C. The motion detection zones 110A, 110B, and 110C are referred to collectively herein as motion detection zones 100. In some instances, the motion detection zones 110 can include, for example, air, solid materials, liquids, or another medium through which wireless electromagnetic signals may propagate.

In the example shown in FIG. 1, when an object moves in any of the motion detection zones 110, the motion detection system may detect the motion based on signals transmitted through the relevant motion detection zone 110. Generally, the object can be any type of static or moveable object, and can be living or inanimate. For example, the object can be a human (e.g., the person 106 shown in FIG. 1), an animal, an inorganic object, or another device, apparatus, or assembly, an object that defines all or part of the boundary of a space (e.g., a wall, door, window, etc.), or another type of object.

In some examples, the wireless signals propagate through a structure (e.g., a wall) before or after interacting with a moving object, which may allow the object's motion to be detected without an optical line-of-sight between the moving object and the transmission or receiving hardware. In some instances, the motion detection system may communicate the motion detection event to another device or system, such as, for example, a security system or a control center.

In some cases, the wireless communication devices 102 themselves are configured to perform one or more operations of the motion detection system, for example, by executing computer-readable instructions (e.g., software or firmware) on the wireless communication devices 102. For example, each wireless communication device 102 may process received wireless signals to detect motion based on changes in the communication channel. In some cases, another device (e.g., a remote server, a cloud-based computer system, a network-attached device, etc.) is configured to perform one or more operations of the motion detection system. For example, each wireless communication device 102 may send channel information to a specified device, system, or service that performs operations of the motion detection system.

In an example aspect of operation, wireless communication devices 102A, 102B may broadcast wireless signals or address wireless signals to the other wireless communication device 102C, and the wireless communication device 102C (and potentially other devices) receives the wireless signals transmitted by the wireless communication devices 102A, 102B. The wireless communication device 102C (or another system or device) then processes the received wireless signals to detect motion of an object in a space accessed by the wireless signals (e.g., in the zones 110A, 110B). In some instances, the wireless communication device 102C (or another system or device) may perform one or more operations of a motion detection system.

Figure 2A:
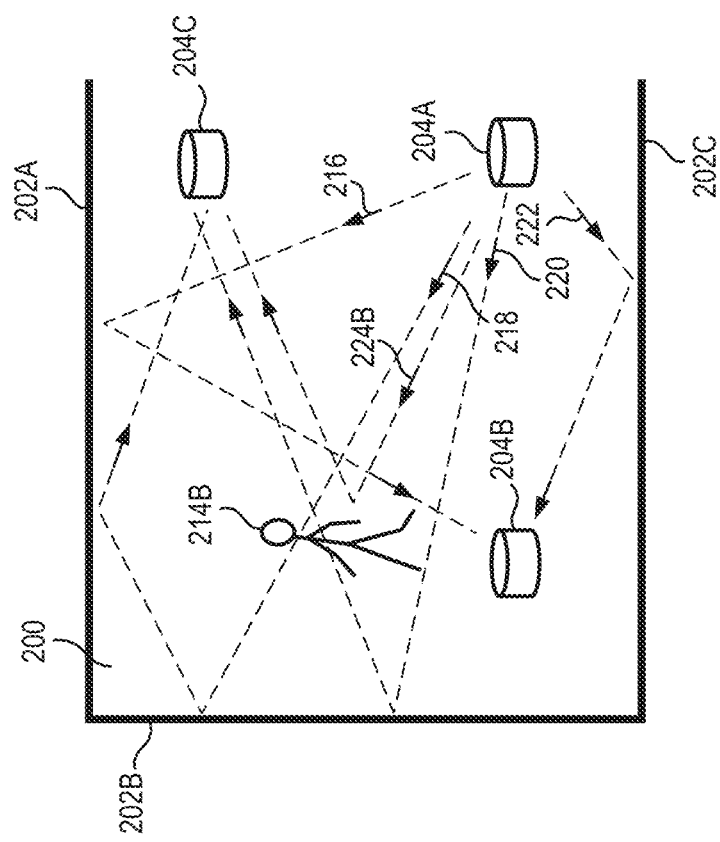
FIGS. 2A-2B are diagrams showing example wireless signals communicated between wireless communication devices.
Figure 2B:
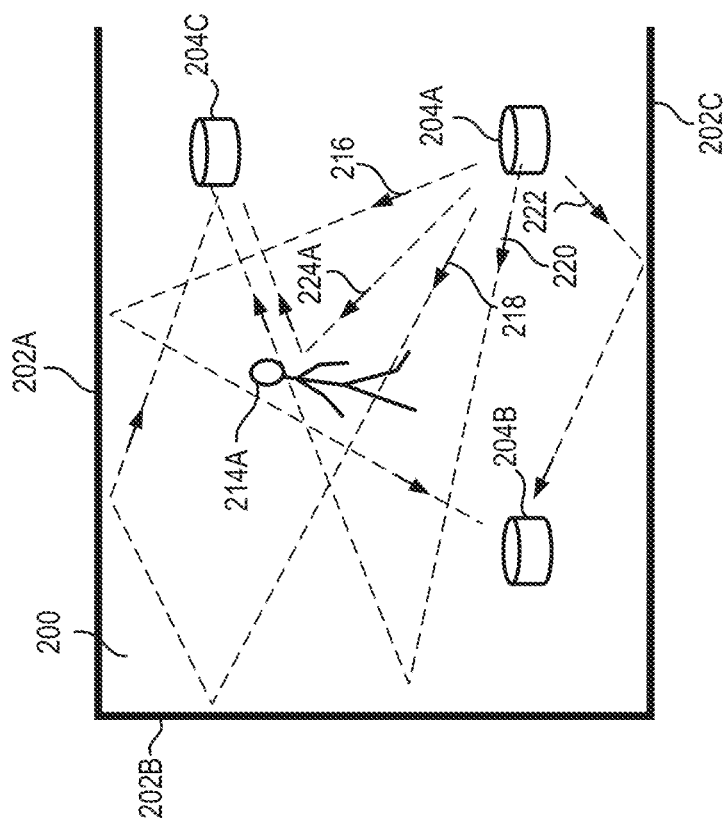

FIGS. 2A and 2B are diagrams showing example wireless signals communicated between wireless communication devices 204A, 204B, 204C. The wireless communication devices 204A, 204B, 204C can be, for example, the wireless communication devices 102A, 102B, 102C shown in FIG. 1, or may be other types of wireless communication devices.

In some cases, a combination of one or more of the wireless communication devices 204A, 204B, 204C can be part of, or may be used by, a motion detection system. The example wireless communication devices 204A, 204B, 204C can transmit wireless signals through a space 200. The example space 200 may be completely or partially enclosed or open at one or more boundaries of the space 200. The space 200 may be or may include an interior of a room, multiple rooms, a building, an indoor area, outdoor area, or the like. A first wall 202A, a second wall 202B, and a third wall 202C at least partially enclose the space 200 in the example shown.

In the example shown in FIGS. 2A and 2B, the first wireless communication device 204A transmits wireless motion probe signals repeatedly (e.g., periodically, intermittently, at scheduled, unscheduled, or random intervals, etc.). The second and third wireless communication devices 204B, 204C receive signals based on the motion probe signals transmitted by the wireless communication device 204A.

As shown, an object is in a first position 214A at an initial time (to) in FIG. 2A, and the object has moved to a second position 214B at subsequent time ($t_1$) in FIG. 2B. In FIGS. 2A and 2B, the moving object in the space 200 is represented as a human, but the moving object can be another type of object. For example, the moving object can be an animal, an inorganic object (e.g., a system, device, apparatus, or assembly), an object that defines all or part of the boundary of the space 200 (e.g., a wall, door, window, etc.), or another type of object. In the example shown in FIGS. 2A and 2B, the wireless communication devices 204A, 204B, 204C are stationary and are, consequently, at the same position at the initial time to and at the subsequent time $t_1$. However, in other examples, one or more of the wireless communication devices 204A, 204B, 204C are mobile and may move between initial time to and subsequent time $t_1$.

As shown in FIGS. 2A and 2B, multiple example paths of the wireless signals transmitted from the first wireless communication device 204A are illustrated by dashed lines. Along a first signal path 216, the wireless signal is transmitted from the first wireless communication device 204A and reflected off the first wall 202A toward the second wireless communication device 204B. Along a second signal path 218, the wireless signal is transmitted from the first wireless communication device 204A and reflected off the second wall 202B and the first wall 202A toward the third wireless communication device 204C. Along a third signal path 220, the wireless signal is transmitted from the first wireless communication device 204A and reflected off the second wall 202B toward the third wireless communication device 204C. Along a fourth signal path 222, the wireless signal is transmitted from the first wireless communication device 204A and reflected off the third wall 202C toward the second wireless communication device 204B.

In FIG. 2A, along a fifth signal path 224A, the wireless signal is transmitted from the first wireless communication device 204A and reflected off the object at the first position 214A toward the third wireless communication device 204C. Between time to in FIG. 2A and time $t_1$ in FIG. 2B, the object moves from the first position 214A to a second position 214B in the space 200 (e.g., some distance away from the first position 214A). In FIG. 2B, along a sixth signal path 224B, the wireless signal is transmitted from the first wireless communication device 204A and reflected off the object at the second position 214B toward the third wireless communication device 204C. The sixth signal path 224B depicted in FIG. 2B is longer than the fifth signal path 224A depicted in FIG. 2A due to the movement of the object from the first position 214A to the second position 214B. In some examples, a signal path can be added, removed, or otherwise modified due to movement of an object in the space 200.

The example wireless signals shown in FIGS. 2A and 2B can experience attenuation, frequency shifts, phase shifts, or other effects through their respective paths 216, 218, 220, 222, 224A, 224B and may have portions that propagate in another direction, for example, through the walls 202A, 202B, and 202C. In some examples, the wireless signals are radio frequency (RF) signals. The wireless signals may include other types of signals.

The transmitted signal can have a number of frequency components in a frequency bandwidth, and the transmitted signal may include one or more bands within the frequency bandwidth. The transmitted signal may be transmitted from the first wireless communication device 204A in an omnidirectional manner, in a directional manner, or otherwise. In the example shown, the wireless signals traverse multiple respective paths in the space 200, and the signal along each path can become attenuated due to path losses, scattering, reflection, or the like and may have a phase or frequency offset.

As shown in FIGS. 2A and 2B, the signals from various paths 216, 218, 220, 222, 224A, and 224B combine at the third wireless communication device 204C and the second wireless communication device 204B to form received signals. Because of the effects of the multiple paths in the space 200 on the transmitted signal, the space 200 may be represented as a transfer function (e.g., a filter) in which the transmitted signal is input and the received signal is output. When an object moves in the space 200, the attenuation or phase offset applied to a wireless signal along a signal path can change, and hence, the transfer function of the space 200 can change. When the same wireless signal is transmitted from the first wireless communication device 204A, if the transfer function of the space 200 changes, the output of that transfer function, e.g., the received signal, can also change. A change in the received signal can be used to detect motion of an object. Conversely, in some cases, if the transfer function of the space does not change, the output of the transfer function—the received signal—may not change.

Figure 2C:
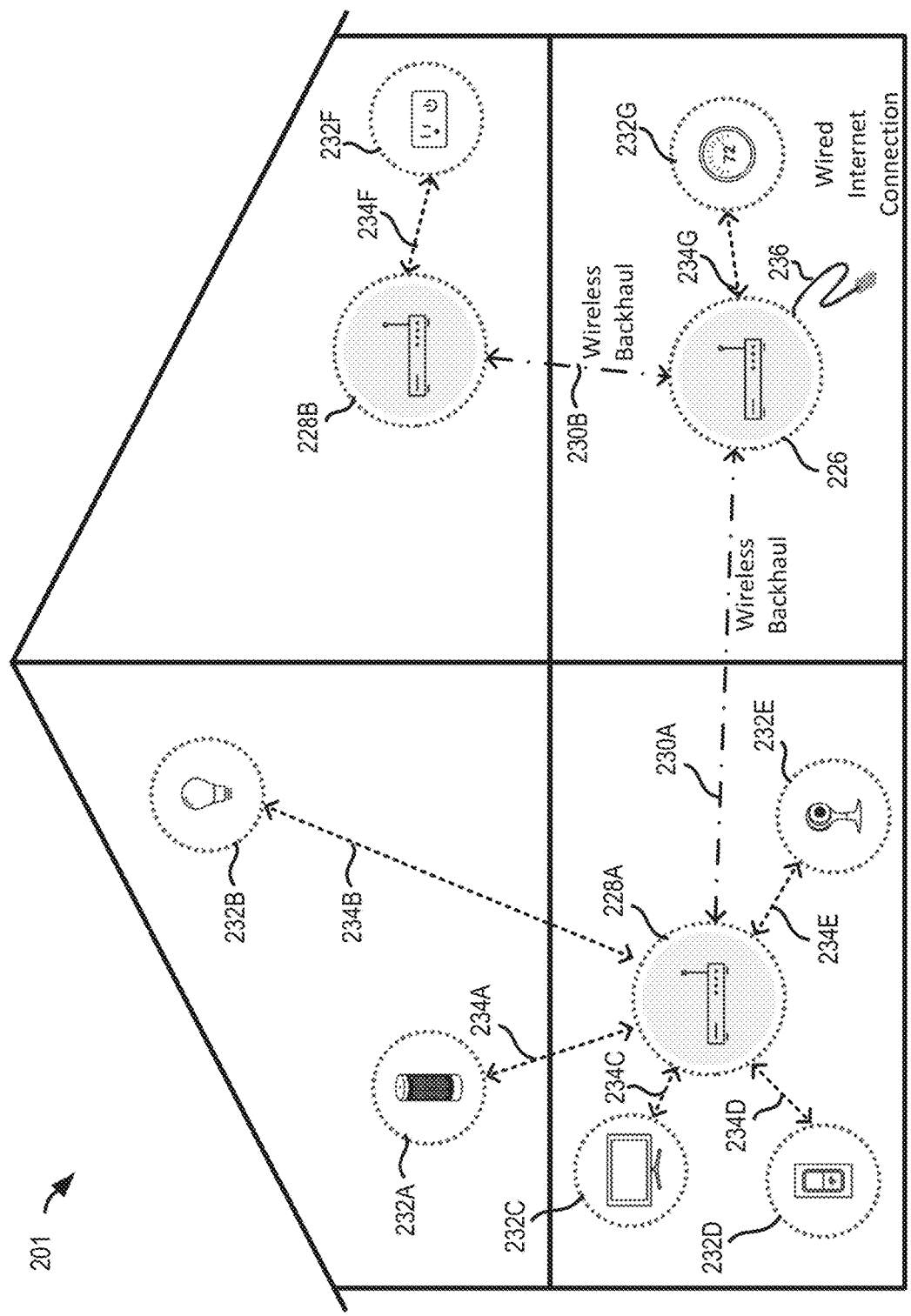
FIG. 2C is a diagram showing an example wireless sensing system operating to detect motion in a space.

FIG. 2C is a diagram showing an example wireless sensing system operating to detect motion in a space 201. The example space 201 shown in FIG. 2C is a home that includes multiple distinct spatial regions or zones. In the example shown, the wireless motion detection system uses a multi-AP home network topology (e.g., mesh network or a Self-Organizing-Network (SON)), which includes three access points (APs): a central access point 226 and two extension access points 228A, 228B. In a typical multi-AP home network, each AP typically supports multiple bands (2.4G, 5G, 6G), and multiple bands may be enabled at the same time. Each AP can use a different Wi-Fi channel to serve its clients, as this may allow for better spectrum efficiency.

In the example shown in FIG. 2C, the wireless communication network includes a central access point 226. In a multi-AP home Wi-Fi network, one AP may be denoted as the central AP. This selection, which is often managed by manufacturer software running on each AP, is typically the AP that has a wired Internet connection 236. The other APs 228A, 228B connect to the central AP 226 wirelessly, through respective wireless backhaul connections 230A, 230B. The central AP 226 may select a wireless channel different from the extension APs to serve its connected clients.

In the example shown in FIG. 2C, the extension APs 228A, 228B extend the range of the central AP 226, by allowing devices to connect to a potentially closer AP or different channel. The end user need not be aware of which AP the device has connected to, as all services and connectivity would generally be identical. In addition to serving all connected clients, the extension APs 228A, 228B connect to the central AP 226 using the wireless backhaul connections 230A, 230B to move network traffic between other APs and provide a gateway to the Internet. Each extension AP 228A, 228B may select a different channel to serve its connected clients.

In the example shown in FIG. 2C, client devices (e.g., Wi-Fi client devices) 232A, 232B, 232C, 232D, 232E, 232F, 232G are associated with either the central AP 226 or one of the extension APs 228 using a respective wireless link 234A, 234B, 234C, 234D, 234E, 234F, 234G. The client devices 232 that connect to the multi-AP network may operate as leaf nodes (e.g., mobile devices, smart devices, etc.) that access the mesh network through one of the APs in the multi-AP network. In some implementations, the client devices 232 may include wireless-enabled devices (e.g., mobile devices, a smartphone, a smart watch, a tablet, a laptop computer, a smart thermostat, a wireless-enabled camera, a smart TV, a wireless-enabled speaker, a wireless-enabled power socket, etc.).

When the client devices 232 seek to connect to and associate with their respective APs 226, 228, the client devices 232 may go through an authentication and association phase with their respective APs 226, 228. Among other things, the association phase assigns address information (e.g., an association ID or another type of unique identifier) to each of the client devices 232. For example, within the IEEE 802.11 family of standards for Wi-Fi, each of the client devices 232 can identify itself using a unique address (e.g., a 48-bit address, an example being the MAC address), although the client devices 232 may be identified using other types of identifiers embedded within one or more fields of a message. The address information (e.g., MAC address or another type of unique identifier) can be either hardcoded and fixed, or randomly generated according to the network address rules at the start of the association process. Once the client devices 232 have associated to their respective APs 226, 228, their respective address information may remain fixed. Subsequently, a transmission by the APs 226, 228 or the client devices 232 typically includes the address information (e.g., MAC address) of the transmitting wireless device and the address information (e.g., MAC address) of the receiving device.

In the example shown in FIG. 2C, the wireless backhaul connections 230A, 230B carry data between the APs and may also be used for motion detection. Each of the wireless backhaul channels (or frequency bands) may be different than the channels (or frequency bands) used for serving the connected Wi-Fi devices.

In the example shown in FIG. 2C, wireless links 234A, 234B, 234C, 234D, 234E, 234F, 234G may include a frequency channel used by the client devices 232A, 232B, 232C, 232D, 232E, 232F, 232G to communicate with their respective APs 226, 228. Each AP can select its own channel independently to serve their respective client devices, and the wireless links 234 may be used for data communications as well as motion detection.

The motion detection system, which may include one or more motion detection or localization processes running on one or more of the client devices 232 or on one or more of the APs 226, 228, may collect and process data (e.g., channel information) corresponding to local links that are participating in the operation of the wireless sensing system. The motion detection system can be installed as a software or firmware application on the client devices 232 or on the APs 226, 228, or may be part of the operating systems of the client devices 232 or the APs 226, 228.

In some implementations, the APs 226, 228 do not contain motion detection software and are not otherwise configured to perform motion detection in the space 201. Instead, in such implementations, the operations of the motion detection system may be executed on one or more of the client devices 232. In other implementations, one or more operations of the motion detection system may be executed on a cloud-based processor. In some implementations, the channel information may be obtained by the client devices 232 by receiving wireless signals from the APs 226, 228 (or possibly from other client devices 232) and processing the wireless signal to obtain the channel information. For example, the motion detection system running on the client devices 232 can have access to channel information provided by the client device's radio firmware (e.g., Wi-Fi radio firmware) so that channel information may be collected and processed.

In some implementations, the client devices 232 send a request to their corresponding AP 226, 228 to transmit wireless signals that can be used by the client device as motion probes to detect motion of objects in the space 201. The request sent to the corresponding AP 226, 228 may be a null data packet frame, a beamforming request, a ping, standard data traffic, or a combination thereof. In some implementations, the client devices 232 are stationary while performing motion detection in the space 201. In other examples, one or more of the client devices 232 can be mobile and may move within the space 201 while performing motion detection.

Mathematically, a signal f(t) transmitted from a wireless communication device (e.g., the wireless communication device 204A in FIGS. 2A and 2B or the APs 226, 228 in FIG. 2C) may be described according to Equation (1):

$$f(t) = \sum_{n=-\infty}^{\infty} c_n e^{j\omega_n t} \tag{1}$$

where $\omega_n$ represents the frequency of $n^{th}$ frequency component of the transmitted signal, $c_n$ represents the complex coefficient of the $n^{th}$ frequency component, and t represents time. With the transmitted signal f(t) being transmitted, an output signal $r_k(t)$ from a path k may be described according to Equation (2):

$$r_k(t) = \sum_{n=-\infty}^{\infty} \alpha_{n,k} c_n e^{j(\omega_n t + \phi_{n,k})} \tag{2}$$

where $\alpha_{n,k}$ represents an attenuation factor (or channel response; e.g., due to scattering, reflection, and path losses) for the $n^{th}$ frequency component along path k, and $\phi_{n,k}$ represents the phase of the signal for $n^{th}$ frequency component along path k. Then, the received signal R at a wireless communication device can be described as the summation of all output signals $r_k(t)$ from all paths to the wireless communication device, which is shown in Equation (3):

$$R = \sum_k r_k(t) \tag{3}$$

Substituting Equation (2) into Equation (3) renders the following Equation (4):

$$R = \sum_k \sum_{n=-\infty}^{\infty} (\alpha_{n,k} e^{j\phi_{n,k}}) c_n e^{j\omega_n t} \tag{4}$$

The received signal R at a wireless communication device (e.g., the wireless communication devices 204B, 204C in FIGS. 2A and 2B or the client devices 232 or the APs 226, 228 in FIG. 2C) can then be analyzed (e.g., using one or more motion detection algorithms) to detect motion. The received signal R at a wireless communication device can be transformed to the frequency domain, for example, using a Fast Fourier Transform (FFT) or another type of algorithm. The transformed signal can represent the received signal R as a series of n complex values, one for each of the respective frequency components (at the n frequencies @n). For a frequency component at frequency @n, a complex value $Y_n$ may be represented as follows in Equation (5):

$$Y_n = \sum_k c_n \alpha_{n,k} e^{j\phi_{n,k}}. \quad (5)$$

The complex value $Y_n$ for a given frequency component @n indicates a relative magnitude and phase offset of the received signal at that frequency component @n. The signal f(t) may be repeatedly transmitted within a time period, and the complex value $Y_n$ can be obtained for each transmitted signal f(t). When an object moves in the space, the complex value $Y_n$ changes over the time period due to the channel response $\alpha_{n,k}$ of the space changing. Accordingly, a change detected in the channel response (and thus, the complex value $Y_n$) can be indicative of motion of an object within the communication channel or relative motion of a transmitter or receiver. Conversely, a stable channel response may indicate lack of motion. Thus, in some implementations, the complex values $Y_n$ for each of multiple devices in a wireless network can be processed to detect whether motion has occurred in a space traversed by the transmitted signals f(t). The channel response can be expressed in either the time-domain or frequency-domain, and the Fourier-Transform or Inverse-Fourier-Transform can be used to switch between the time-domain expression of the channel response and the frequency-domain expression of the channel response.

In another aspect of FIGS. 2A, 2B, 2C, beamforming state information may be used to detect whether motion has occurred in a space traversed by the transmitted signals f(t). For example, beamforming may be performed between devices based on some knowledge of the communication channel (e.g., through feedback properties generated by a receiver), which can be used to generate one or more steering properties (e.g., a steering matrix) that are applied by a transmitter device to shape the transmitted beam/signal in a particular direction or directions. In some instances, changes to the steering or feedback properties used in the beamforming process indicate changes, which may be caused by moving objects in the space accessed by the wireless signals. For example, motion may be detected by identifying substantial changes in the communication channel, e.g., as indicated by a channel response, steering or feedback properties, or any combination thereof, over a period of time.

In some implementations, for example, a steering matrix may be generated at a transmitter device (beamformer) based on a feedback matrix provided by a receiver device (beamformer) based on channel sounding. Because the steering and feedback matrices are related to propagation characteristics of the channel, these beamforming matrices change as objects move within the channel. Changes in the channel characteristics are accordingly reflected in these matrices, and by analyzing the matrices, motion can be detected, and different characteristics of the detected motion can be determined. In some implementations, a spatial map may be generated based on one or more beamforming matrices. The spatial map may indicate a general direction of an object in a space relative to a wireless communication device. In some cases, "modes" of a beamforming matrix (e.g., a feedback matrix or steering matrix) can be used to generate the spatial map. The spatial map may be used to detect the presence of motion in the space or to detect a location of the detected motion.

Figure 3A:
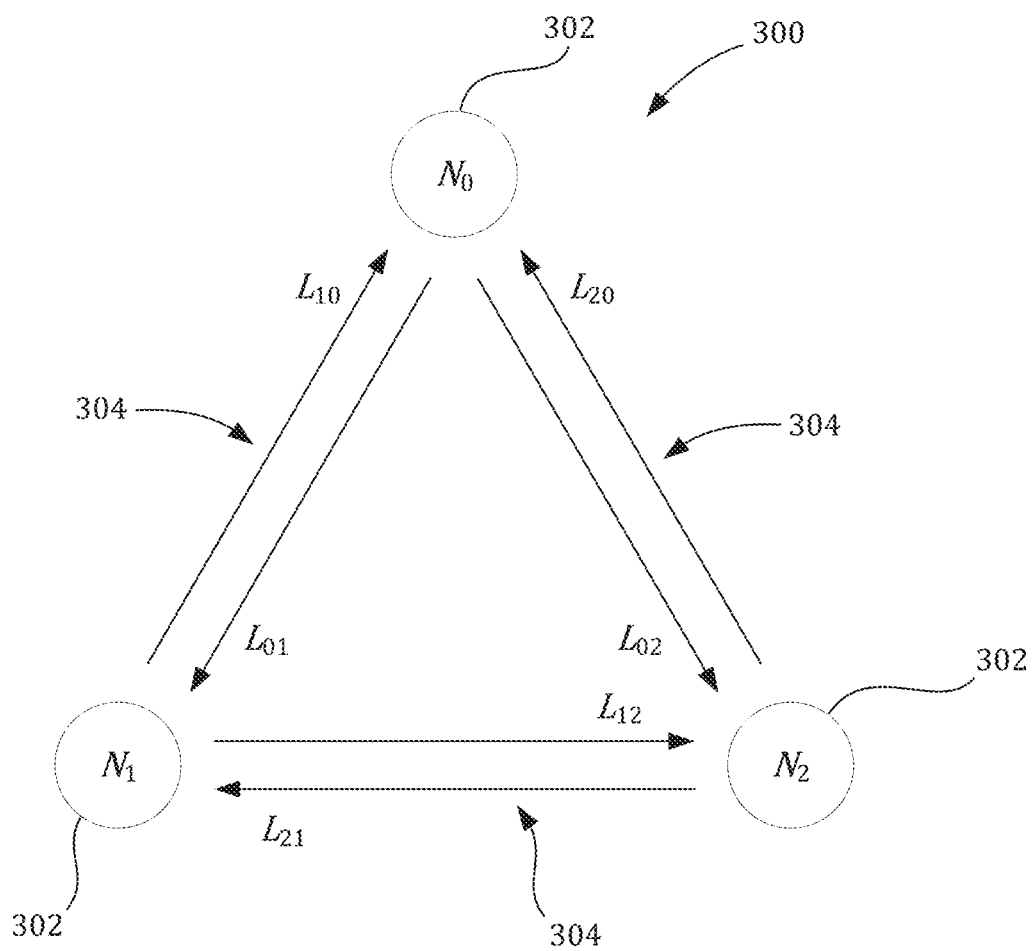
FIG. 3A is a schematic diagram of an example wireless communication network.

FIG. 3A is a schematic diagram of an example wireless communication network 300 that includes a plurality of wireless nodes 302. The plurality of wireless nodes 302 may be analogous to the wireless communication devices 102, 204 of FIGS. 1 and 2A-2B, respectively. In FIG. 3A, three wireless nodes 302 are depicted, labeled $N_0$, $N_1$, and $N_2$. However, other numbers of wireless nodes 302 are possible in the wireless communication network 300. Moreover, other types of nodes are possible. For example, the wireless communication network 300 may include one or more network servers, network routers, network switches, network repeaters, or other type of networking or computing equipment.

The wireless communication network 300 includes wireless communication channels 304 communicatively coupling respective pairs of wireless nodes 302. Such communicative coupling may allow an exchange of wireless signals between wireless nodes 302 over a time frame. In particular, the wireless communication channels 304 allow bi-directional communication between the respective pairs of wireless nodes 302. Such communication may occur along two directions simultaneously (e.g., full duplex) or along only one direction at a time (e.g., half duplex). In some instances, such as shown in FIG. 3A, the wireless communication channels 304 communicatively couple every pair of the plurality of wireless nodes 302. In other instances, one or more pairs of wireless nodes 302 may lack a corresponding wireless communication channel 304.

Each wireless communication channel 304 includes two or more wireless links, including at least one for each direction in the bi-directional communication. In FIG. 3A, an arrow represents each individual wireless link. The arrow is labeled $L_{ij}$ where a first subscript, i, indicates a transmitting wireless node and a second subscript, j, indicates a receiving wireless node. For example, wireless nodes $N_0$ and $N_1$ are communicatively coupled by two wireless links that are indicated in FIG. 3A by two arrows, $L_{01}$ and $L_{10}$. Wireless link $L_{01}$ corresponds to wireless communication along a first direction from No to $N_1$ and wireless link $L_{10}$ corresponds wireless communication along a second, opposing direction from $N_1$ to $N_0$.

In some implementations, the wireless communication network 300 obtains a set of motion indicator values associated with a time frame, which may include the processes of motion detection described in relation to FIGS. 2A-2B. The set of motion indicator values indicate motion detected from wireless links in a wireless communication network. Each motion indicator value is associated with a respective wireless link. The motion may be detected using one or more wireless links (e.g., one or more wireless links $L_{01}$, $L_{10}$, $L_{02}$, $L_{20}$, $L_{12}$, and $L_{21}$ of FIG. 3A) in the wireless communication network (e.g., the wireless communication network 300). Each of the wireless links is defined between a respective pair of wireless communication devices in the wireless communication network (e.g., pair combinations of wireless nodes $N_0$, $N_1$, and $N_2$).

In some variations, the wireless communication network 300 may include a data processing apparatus that executes program instructions (e.g., a network server, a wireless communication device, a network router, etc.). The program instructions may cause the data processing apparatus to assign a unique node identifier to each of the wireless nodes 302 in the wireless communication network 300. The unique node identifier may be mapped to a media access control (MAC) address value, which corresponds to a MAC address (or portion thereof) associated with a wireless node. For example, the wireless nodes $N_0$, $N_1$, and $N_2$ of FIG. 3A may be associated with a six-character portion of their respective MAC addresses, which is then mapped to a unique node identifier:

$$\{N_0, N_1, N_2\} \rightarrow \{7f4440, 7f4c9e, 7f630c\} \rightarrow \{0, 1, 2\}$$

Here, the MAC address values of 7f4440, 7f4c9e, and 7f630c are mapped to respective unique node identifiers 0, 1, and 2. The program instructions may also cause the data processing apparatus to associate the wireless links with their respective pairs of wireless nodes via corresponding pairs of MAC address values. The MAC address values may then be mapped to a unique link identifier to form a link table. For example, the wireless links $L_{01}$, $L_{10}$, $L_{02}$, $L_{20}$, $L_{12}$, and $L_{21}$ of FIG. 3A may be mapped to unique link identifiers according to:

$$\begin{Bmatrix} L_{01} \\ L_{02} \\ L_{10} \\ L_{12} \\ L_{20} \\ L_{21} \end{Bmatrix} \rightarrow \begin{Bmatrix} 7f4440 \rightarrow 7f4c9e \\ 7f4440 \rightarrow 7f630c \\ 7f4c9e \rightarrow 7f4440 \\ 7f4c9e \rightarrow 7f630c \\ 7f630c \rightarrow 7f4440 \\ 7f630c \rightarrow 7f4c9e \end{Bmatrix} \rightarrow \begin{Bmatrix} 0 \\ 1 \\ 2 \\ 3 \\ 4 \\ 5 \end{Bmatrix}$$

The MAC address values may be ordered, from left to right, to indicate respective pairs of transmitting and receiving wireless nodes in a wireless link. In particular, the left MAC address value may correspond to a transmitting wireless node and the right MAC address value may correspond to a receiving wireless node. Such mappings of unique node and link identifiers may aid the data processing apparatus in performing operations, such as searching, sorting, and matrix manipulation, during processes of motion detection.

The program instructions may additionally cause the data processing apparatus to poll the wireless links (or wireless nodes 302) to obtain motion indicator values for each wireless link in the plurality of wireless links. For example, the wireless links of the wireless communication network 300 of FIG. 3A may report motion indicator values according to a data structure, such as shown below:

$$\begin{pmatrix} 0 & 0.00 \\ 1 & 0.00 \\ 2 & 0.71 \\ 3 & 1.07 \\ 4 & 1.15 \\ 5 & 1.30 \end{pmatrix}$$

In the data structure, the first column corresponds to the unique link identifiers of the wireless links and the second column of the data structure corresponds to their respective motion indicator values. Generally, a higher motion indicator value is indicative of a higher degree of perturbation of a particular wireless link. The data structure may be an array, as shown above, or some other type of data structure (e.g., a vector). Although data structure is presented as having three significant digits for each motion indicator value, other numbers of significant digits are possible for the motion indicator values (e.g., 2, 5, 9, etc.).

Figure 3B:
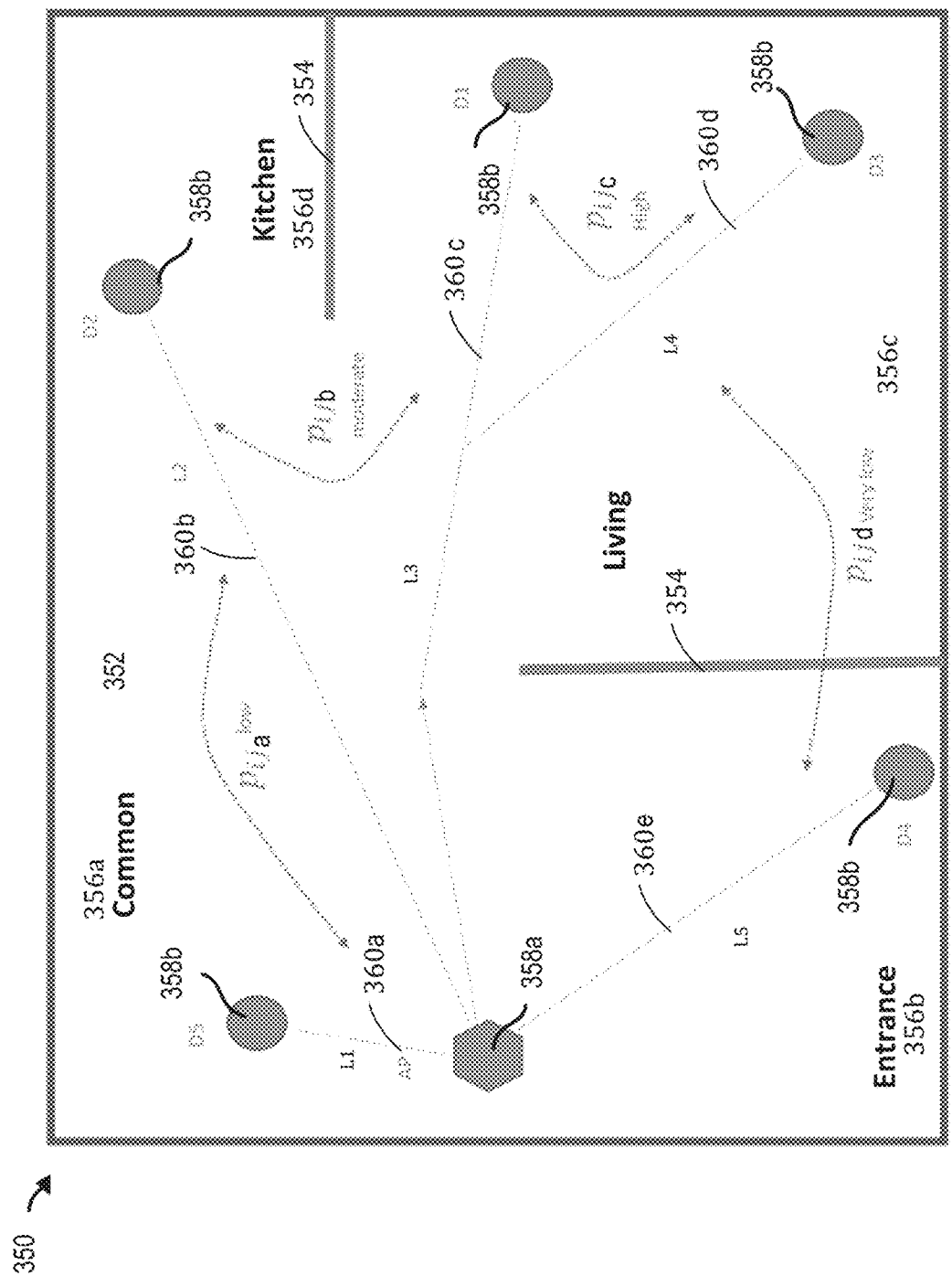
FIG. 3B is a diagram of an example space associated with a wireless communication network.

Now referring to FIG. 3B, a diagram is presented of an example space 350 associated with a wireless communication network 352. The example space 350 may be a residence partitioned by one or more physical walls 354 to define various regions 356 such as a common area 356a, an entrance 356b, a living room 356c, a kitchen 356d, and so forth. The wireless communication network 352 may include wireless communication devices 358 (a and b) connected by wireless links 360. For example, wireless link 360a connects the AP 358a with wireless communication device D5 (358b). Wireless link 360b connects the AP 358a with the wireless communication device D2 (358b). Wireless link 360c connects the AP 358a with the wireless communication device D1 (358b). Wireless link 360d connects the AP 358a with the wireless communication device D3 (358b). Wireless link 360e connects the AP 358a with the wireless communication device (358b). In FIG. 3B, the wireless communication devices 358 (a and b) are labeled Di where i=the ith wireless communication device 358 (a and b). Similarly, the wireless links 360 are labeled by Li where i=the ith wireless link 360. The wireless communication devices 358 (a and b) may include a wireless AP 358a, which can serve as a hub in the wireless communication network 352, and a wireless client 358b, such as a mobile device, a smartphone, a smart watch, a tablet, a laptop computer, a smart thermostat, a wireless-enabled camera, a smart TV, a wireless-enabled speaker, a wireless-enabled power socket, and so forth. The wireless links 360 may be defined by respective pairs of wireless communication devices 358 (a and b) in the wireless communication network 352. The wireless communication network 352 may be part or all of a motion detection system that, in many variations, generates motion-sensing data based on wireless signals transmitted over the wireless links 360.

In certain cases, the example space 350 may include an object or person that moves therein. The motion of such an object or person may disturb the wireless links 360, and in particular, pairs of wireless links 360 adjacent each other. A probability—shown as $p_{ij}$ in FIG. 3B—may be associated with pairs of wireless links that are sequentially disturbed by motion in time. For example, the probability $p_{ij}$ (a) is associated with the wireless links $L_1$ and $L_2$. The probability $p_{ij}$ (b) is associated with the wireless links $L_2$ and $L_3$. The probability $p_{ij}$ (c) is associated with the wireless links $L_3$ and $L_4$. The probability $p_{ij}$ (d) is associated with the wireless links $L_4$ and $L_5$. This probability may scale inversely in magnitude with a distance between wireless communication devices 358 (a and b) defining the pair of wireless links. For example, the probability may scale inversely with a distance between a first wireless communication device associated with a first of the pair of wireless links and a second wireless communication device associated with a second of the pair of wireless links disturbed by the motion. The pair of wireless links may share a wireless communication device in common (e.g., a wireless AP 358a). FIG. 3B depicts the pair of wireless links associated with respective wireless clients 358b. However, other types of wireless communication devices 358 are possible (e.g., APs).

The probability of sequential disturbance may be influenced by factors in the example space 350, such as a relative location of wireless communication devices 358 (a and b) defining the pair of wireless links and physical objects (e.g., the one or more physical walls 354) therebetween. A sequential disturbance is the probability of exciting one particular set of links, right after another particular set of links. For example, wireless communication devices 358 (a and b) that are close to each other, such as wireless communication devices D1 and D3, may define a pair of wireless links (e.g., L3 and L4) that have a higher probability of sequential disturbance than a pair of wireless links (e.g., L1 and L2) defined by wireless communications devices 358 (a and b) that are farther away from each other, such as wireless communication devices D2 and D5. The presence of a physical wall 354 may impede motion of the object or person and thus reduce a transition of the object or person from one side of the physical wall 354 to the other. For example, the pair of wireless links L2 and L3 in the example space 350 are separated by a physical wall 354, and as such, the probability of their sequential disturbance may be reduced relative to situations where the physical wall 354 is absent. The calculation of these sequential probabilities happens over a certain interval of time. The interval over which this integration happens is a design parameter. A typically-suggested interval for determining these transition probabilities is that of one day (24 hours) which allows (but not always) that user has visited all the locations associated with different wireless devices, and has disturbed all the links at least once, for the system to have estimated these sequential or transition probabilities.

In some implementations, the example space 350 corresponds to a house partitioned into different living spaces. The example entrance 356b and the living room 356c may have a large wall separating them, so a person entering the entrance 356b will not be able to go into the living room 356c without passing through the common area 356a where the wireless AP 358a is located. Because the person is unable to traverse directly between the entrance 356b and the living room 356c, the motion-sensing data will represent a low probability of transitions between the entrance and living room footprints of the wireless links 360 (e.g., between L4 and L5). As such, the motion-sensing data may provide a basis for a map of the house that places the entrance 356b and living room 356c away from each other. Moreover, the kitchen 356d is on a corner of the house opposite the entrance 356b. Motion between the entrance 356b to the kitchen 356d is even less likely than motion between the entrance 356b and the living room 356c. As such, the motion-sensing data will represent (if at all) a very low probability of transitions between the entrance and kitchen footprints of the wireless links 360 (e.g., between L2 and L5). In this case, the motion-sensing data may provide a basis for a map of the house that places the entrance 356b and kitchen 356d farther away from each other than the entrance 356b and living room 356c. However, the kitchen 356d and the living room 356c are separated by a partial wall. Such a configuration may be analogous to an "open concept" house and thus motion between the kitchen 356d and the living room 356c may be common. The motion-sensing data will therefore more represent a high probability of transitions between the kitchen and living room footprints of the wireless links 360 (e.g., L2 and L3). The motion-sensing data may therefore provide a basis for a map of the house that places the kitchen 356d and the living room 356c close to each other (e.g., adjacent each other).

As shown in FIG. 3B, different living spaces of the house may be associated with one or more wireless communication devices. The common area 356a, the entrance 356b, and the kitchen 356d are associated with, for example, respective wireless communication devices D5, D4, and D2. The living room 356c is associated with two wireless communication devices D1 and D3. In some instances, the one or more wireless communication devices allow the sequential disturbance of two wireless links 360 to be related to motion of an object or person between different living spaces. For example, the sequential disturbance of wireless links L2 and L3 may be related to motion between the living room 356c and the kitchen 356d. In some instances, the one or more wireless communication devices allow the sequential disturbance of two wireless links 360 to be related to motion within a single living space. For example, the sequential disturbance of wireless links L3 and L4 may be related to motion within the living room 356c.

As discussed above, the probability of disturbing a pair of wireless links 360 in the house can be related to a distance between two wireless communication devices associated with the pair of wireless links 360. For example, wireless communication devices D1 and D3 are closer to each other than wireless communication devices D2 and D5. As such, the probability of wireless links L3 and L4 being sequentially disturbed may be higher than the probability of wireless links L1 and L2 being sequentially disturbed. Motion-sensing data for the house may therefore indicate a high frequency of disturbance for wireless links L3 and L4 relative to wireless links L1 and L2. This motion-sensing data may thus be used to determine the probabilities for the sequential disturbance of wireless links L3 and L4 relative to wireless links L1 and L2. The probabilities, in turn, allow for the distance between wireless communication devices D1 and D3 and the distance between wireless communication devices D2 and D5 to be determined. In general, motion-sensing data for pairs of wireless links 360 in the house may be used to determine distances between pairs of wireless communication devices 358 (a and b), which in turn, can be used to determine a spatial map for the wireless communication devices 358 (a and b).

Figure 3C:
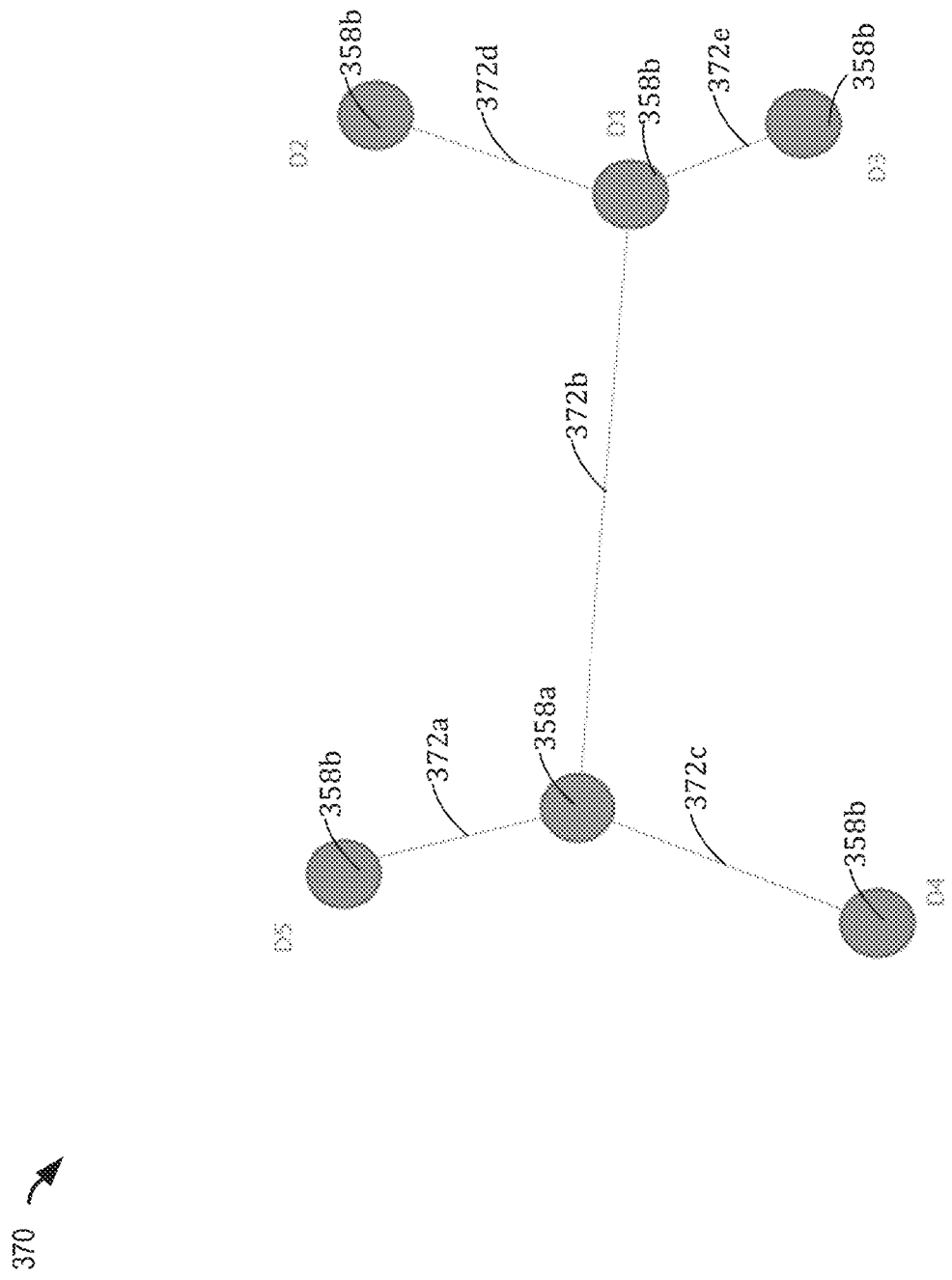
FIG. 3C is a diagram of an example spatial map based on the example space of FIG. 3B.

FIG. 3C is a diagram of an example spatial map 370 based on the example space 350 of FIG. 3B. The example spatial map 370 represents a spatial arrangement of the wireless communication devices 358 (a and b) in the example space 350. The spatial arrangement may be based on spatial coordinates (e.g., x-y coordinates) for each of the wireless communication devices 358 (a and b) in a coordinate system of the example spatial map 370, and the spatial coordinates may be generated based on the motion-sensing data. In some instances, the coordinate system is a physical coordinate system (e.g., using physical coordinates). In other instances, the coordinate system is a logical coordinate system (e.g., using arbitrary coordinates). To generate the spatial coordinates, a computing device may process the motion-sensing data to determine distances between pairs of wireless communication devices 358 (a and b), and from the distances, calculate the spatial coordinates. In many implementations, the spatial arrangement of the wireless communication devices 358 (a and b) includes spatial paths 372 between select pairs of wireless communication devices 358 (a and b). For example, spatial path 372a is between the AP (358a) and the wireless communication device D5 (358b). Spatial path 372b is between the AP (358a) and the wireless communication device D1 (358b). Spatial path 372c is between the AP (358a) and the wireless communication device D4 (358b). Spatial path 372d is between the wireless communication device D1 (358b) and the wireless communication device D2 (358b). Spatial path 372e is between the wireless communication device D1 (358b) and the wireless communication device D3 (358b). The computing device may determine the spatial paths 372 by generating a spanning tree from the spatial coordinates. For example, the computing device may execute a spanning tree algorithm to determine a minimum number of spatial paths 372 to connect the wireless communication devices 358 (a and b). In some instances, the minimum number corresponds to a number of spatial paths 372 with respective lengths that, when summed, have a minimum length.

In some implementations, the computing device determines the spatial coordinates by generating a final set of spatial coordinates from an initial set of spatial coordinates. For example, the computing device may execute program instructions that define an optimization process for the initial set of spatial coordinates. In these implementations, the computing device may produce a first data structure (e.g., a first matrix) from the motion-sensing data that includes a probability value for each pair of wireless links 360. The probability value may represent a probability of the pair of wireless links 360 being sequentially disturbed. The computing device also produces a second data structure (e.g., a second matrix) that includes a distance value for each pair of wireless communication devices 358 (a and b) defining a wireless link 360. The distance value may be based on a probability value (e.g., a reciprocal thereof) and represents a distance between the pair of wireless communication devices 358 (a and b). For instance, the distance $d_{ij}$ between two devices may be related to the probability $p_{ij}$ associated with the two devices as $d_{ij} \propto 1/p_{ij}$ or otherwise. The computing device then converts the distance values into the initial set of spatial coordinates. The initial set of spatial coordinates indicates the locations of the wireless communication devices 358 (a and b) in a two-dimensional coordinate system (e.g., an x-y coordinate system). The two-dimensional coordinate system may be a physical or logical coordinate system. In some instances, the computing device produces a third data structure (e.g., a third matrix) that includes the initial set of spatial coordinates.

In implementations using the optimization process, the computing device then selects arbitrary coordinates for a pair of wireless communication devices 358 (a and b) that define a wireless link 360. The computing device subsequently determines, based on the arbitrary coordinates, a test distance between the pair of wireless communication devices 358 (a and b). This test distance is subtracted from a distance value for the pair of wireless communication devices 358 (a and b) in the second data structure. The resulting difference is then squared. For example, and with reference to FIG. 3B, the second data structure may have a distance value, $d_p^{12}$, representing a distance between wireless communication devices D1 and D2. The distance value, $d_p^{12}$, is based on a probability, $p_{23}$, of wireless links L2 and L3 being sequentially disturbed. The computing device selects arbitrary coordinates, represented by vector x, for wireless communication devices D1 and D2 in the two-dimensional coordinate system. Based on these coordinates, the computing device determines a test distance, $d_p^{12}$, for wireless communication devices D1 and D2 and subtracts the distance value, $d_p^{12}$, from the test distance. The difference is subsequently squared, e.g., $(d_x^{12} - d_p^{12})^2$.

As part of the optimization process, the computing device determines a squared difference for each pair of wireless communication devices 358 (a and b) defining a wireless link 360 (e.g., as described above). The computing device then sums all of the squared differences to produce a residual value that characterizes the arbitrary coordinates selected for the pairs of wireless communication devices 358 (a and b). The computing device subsequently alters the arbitrary coordinates in iterative fashion to find a minimum residual value. The arbitrary coordinates associated with the minimum residual value correspond to the final set of spatial coordinates and may be aggregated into a third data structure (e.g., a third matrix). In some cases, the optimization process can use the objective:

$$X = \mathrm{argmin}_x \sum (D(X) - D_p)^2$$

where X is a vector of coordinates for each device; D (X) is a distance matrix generator from coordinates, and $D_p$ is a distance matrix generator from inverse probabilities.

Figure 4A:
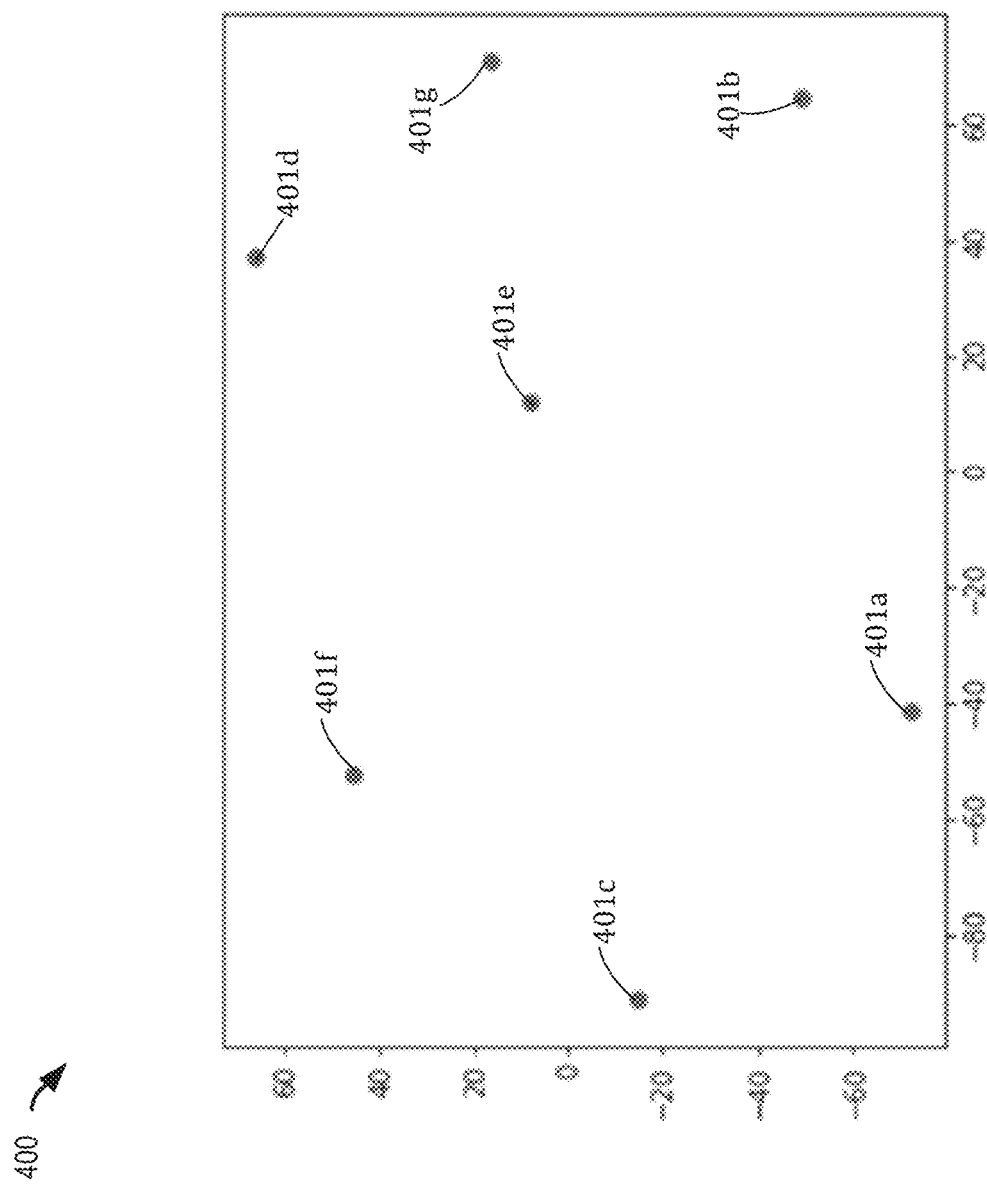
FIG. 4A is a graph showing example spatial coordinates for respective wireless communication devices in a wireless communication network.

FIG. 4A is a graph 400 showing example spatial coordinates for respective wireless communication devices in a wireless communication network. The wireless communication devices may be analogous to those described in relation to FIGS. 3A-3B. The graph 400 includes a two-dimensional coordinate system for the example spatial coordinates. The two-dimensional coordinate system may be based on physical units defining dimensional aspects of a physical space, or alternatively, logical units representing the dimensional aspects. In many variations, the logical units are derived from motion-sensing data that characterizes motion (or an absence thereof) in a space occupied by the wireless communication devices. FIG. 4A illustrates seven spatial coordinates 401a, 401b, 401c, 401d, 401e, 401f, and 401g having the following pairs of coordinate values:

$$\begin{bmatrix} -41.26 & -72.33 \\ 64.41 & -48.97 \\ -91.05 & -15.06 \\ 37.15 & 66.06 \\ 12.23 & 8.29 \\ -52.45 & 45.59 \\ 70.97 & 16.43 \end{bmatrix}$$

However, other numbers of spatial coordinates are possible, and these spatial coordinates may have different, respective pairs of coordinate values than those shown above.

Figure 4B:
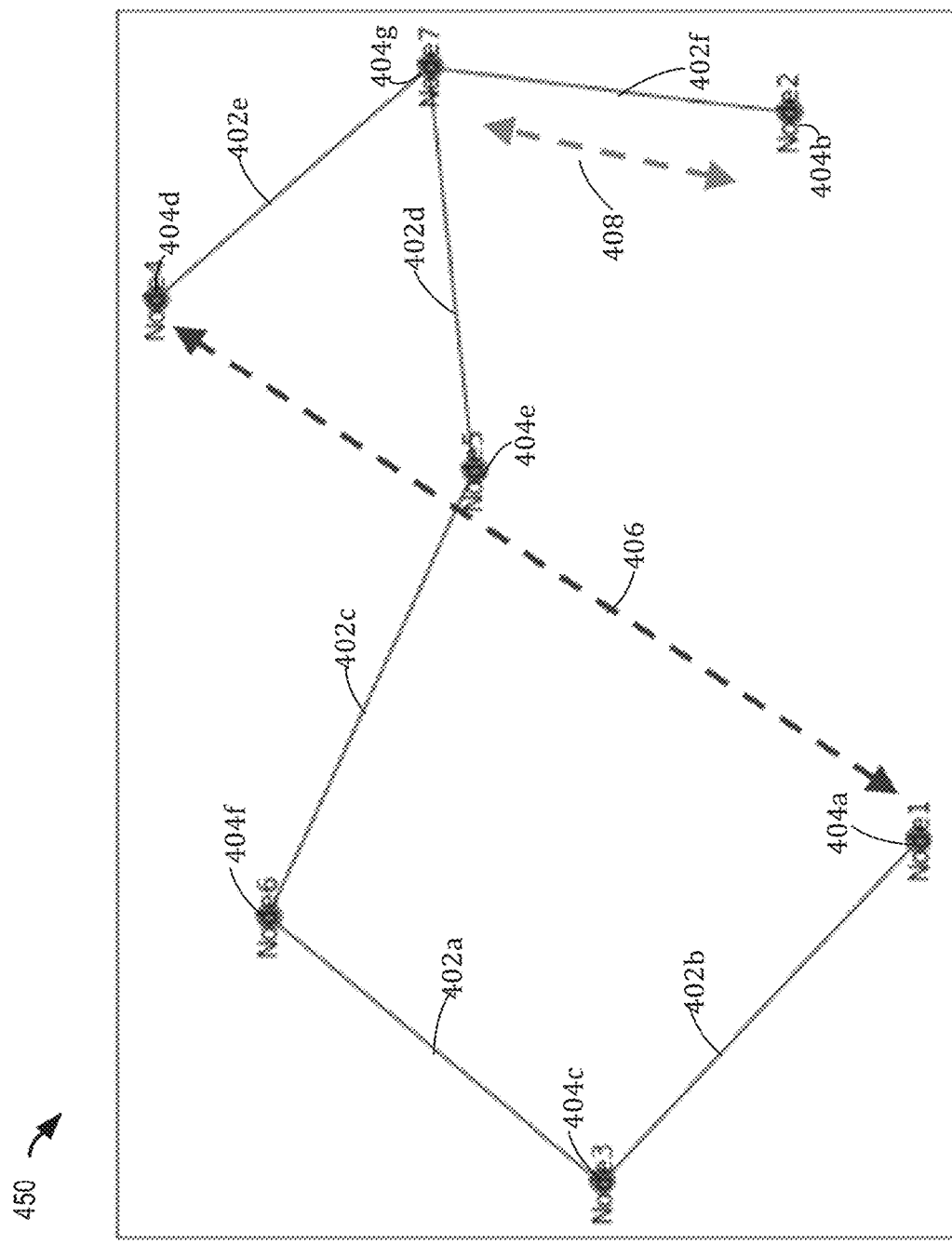
FIG. 4B is a graph showing an example spanning tree for the example spatial coordinates of FIG. 4A.

FIG. 4B is a graph 450 showing an example spanning tree for the example spatial coordinates of FIG. 4A. The example spanning tree may be determined using an optimization process, such as described above in relation to FIG. 3B. The example spanning tree includes spatial paths 402a, 402b, 402c, 402d, 402e, 402f connecting wireless communication devices 404a, 404b, 404c, 404d, 404e, 404f, and 404g (or nodes). For example, spatial path 402a is between node 404c and node 404f. Spatial path 402b is between node 404c and node 404a. Spatial path 402c is between node 404f and node 404e. Spatial path 402d is between node 404e and node 404g. Spatial path 402e is between node 404g and node 404d and spatial path 402f is between node 404g and node 404b. Moreover, the wireless communication devices 404a, 404b, 404c, 404d, 404e, 404f, and 404g are associated with distances in the two-dimensional coordinate system as follows:

$$\begin{bmatrix} 0.00 & 34.96 & 21.16 & 94.69 & 65.70 & 38.05 & 49.46 \\ 34.96 & 0.00 & 81.61 & 47.96 & 24.20 & 87.45 & 20.76 \\ 21.16 & 81.61 & 0.00 & 68.37 & 27.49 & 19.06 & 91.91 \\ 94.69 & 47.96 & 68.37 & 0.00 & 21.50 & 25.76 & 18.38 \\ 65.70 & 24.20 & 27.49 & 21.50 & 0.00 & 51.81 & 42.44 \\ 38.05 & 87.45 & 19.06 & 25.76 & 51.81 & 0.00 & 32.23 \\ 49.46 & 20.76 & 91.91 & 18.38 & 42.44 & 32.23 & 0.00 \end{bmatrix}$$

In the matrix above, each element, $D_{ij}$, represents a distance between a pair of wireless communication devices, i.e., the i-th and j-th wireless communication devices. The matrix is symmetric, indicating that a distance in a forward direction is the same as a distance in a reverse direction and that a distance between the same wireless communication device is null. For example, the distance from the 1$^{st}$ to the 3$^{rd}$ wireless communication device (i.e., $D_{13}$=21.16) is the same as the distance from the 3$^{rd}$ to the 1$^{st}$ wireless communication device (i.e., $D_{31}$=21.16). The distance between the 2$^{nd}$ wireless communication devices is zero (i.e., $D_{22}$=0.00).

The example spanning tree may allow a user to perceive spatial relationships and connective distances between the wireless communication devices 404a, 404b, 404c, 404d, 404e, 404f, and 404g. For example, the graph 450 includes a dotted line 406 illustrated between node 404d and node 404a to indicate the pair of wireless communication devices having the longest distance therebetween. The pair of wireless communication devices corresponds to nodes 1 and 4. Consistent with this indication, the largest value of the matrix (i.e., 94.69) is associated with elements $D_{14}$ and $D_{41}$. As another example, the graph 450 includes a dotted line 408 between node 404b and node 404g to indicate a pair of wireless communication devices having a short distance therebetween. Consistent with this indication, a smaller value of the matrix (i.e., 20.67) is associated with elements $D_{27}$ and $D_{72}$. The smaller value is close to the smallest value of the matrix (19.06).

Figure 5A:
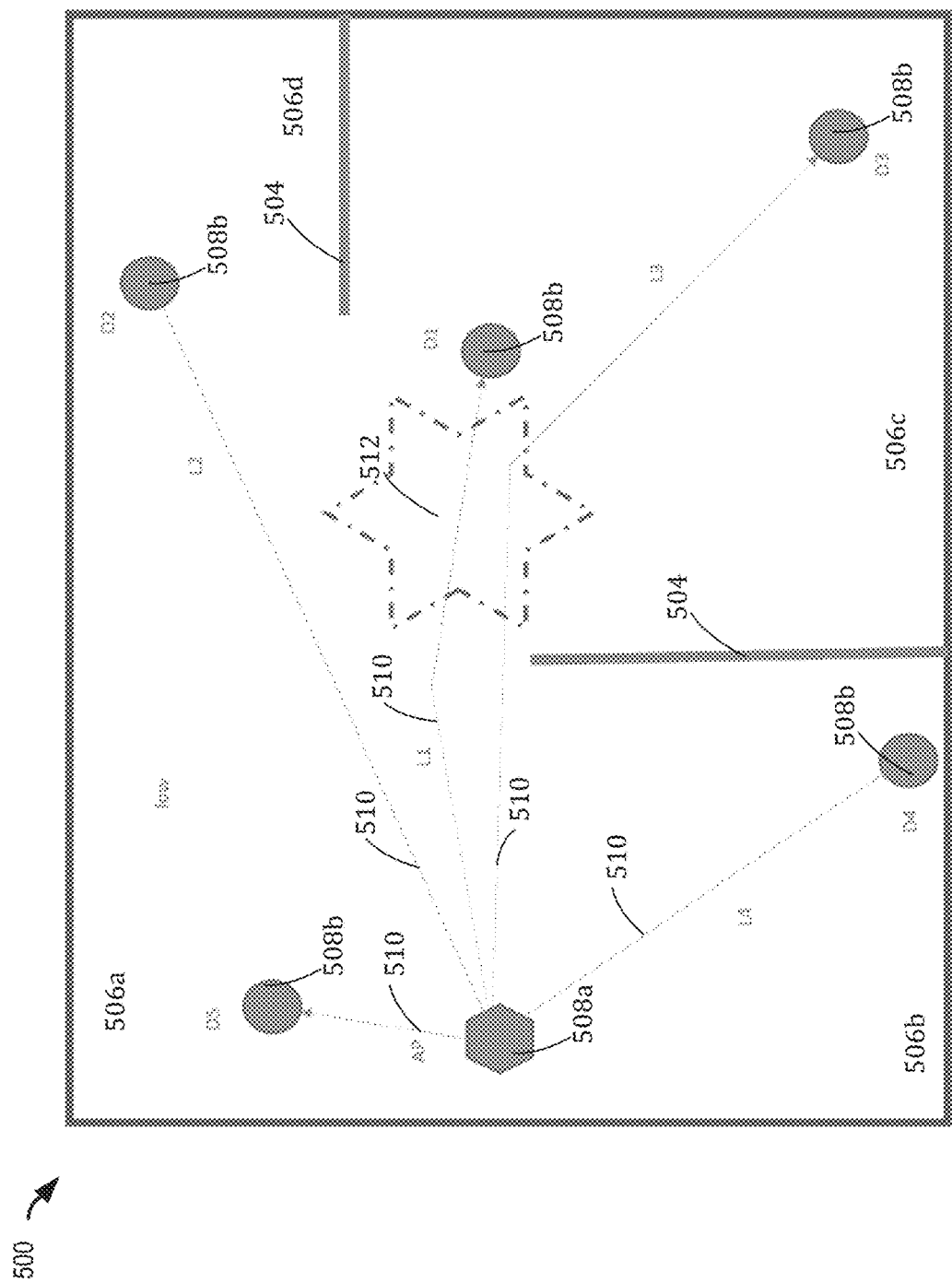
FIG. 5A is a diagram of an example space illustrating overlapping propagation paths.

FIG. 5A is a diagram of an example space 500 that includes a wireless communication network 502. Similar to the space 300 shown in FIG. 3B, the example space 500 in FIG. 5A may be a residence partitioned by one or more physical walls 504 to define various regions 506 such as a common area 506a, an entrance 506b, a living room 506c, a kitchen 506d, and so forth. The wireless communication network 502 may include wireless communication devices 508 connected by wireless links 510. In FIG. 5A, the wireless communication devices 508 are labeled Di where i=the ith wireless communication device 508. Similarly, the wireless links 510 are labeled by Li where i=the ith wireless link 510. The wireless communication devices 508 may include a wireless AP 508a, which can serve as a hub in the wireless communication network 502, and a wireless client 508b, such as a mobile device, a smartphone, a smart watch, a tablet, a laptop computer, a smart thermostat, a wireless-enabled camera, a smart TV, a wireless-enabled speaker, a wireless-enabled power socket, and so forth. The wireless links 510 may be defined by respective pairs of wireless communication devices 508 in the wireless communication network 502. The wireless communication network 502 may be part or all of a motion detection system that, in many variations, generates motion-sensing data based on wireless signals transmitted over the wireless links 510.

As discussed above with respect to FIG. 3B, wireless communication devices 508 that are close to each other, such as wireless communication devices D1 and D3, may define a pair of wireless links (e.g., L3 and L4) that have a higher probability of sequential disturbance than a pair of wireless links (e.g., L1 and L2) defined by wireless communications devices 508 that are farther away from each other, such as wireless communication devices D2 and D5. The presence of a physical wall 504 may impede motion of the object or person and thus reduce a transition of the object or person from one side of the physical wall 504 to the other. For example, the pair of wireless links L2 and L3 in the example space 500 are separated by a physical wall 504, and as such, the probability of their sequential disturbance may be reduced relative to situations where the physical wall 504 is absent.

In some implementations, the physical paths traversed by multiple wireless links may overlap or intersect. As illustrated in FIG. 5A, portions of the path of link L3, may intersect or overlap with portions of the path of link L1. Hence L1 and L3 have an overlap in the space 500. The area of link overlap is illustrated in FIG. 5A by star-shaped region 512. When motion occurs in the region 512, such overlap may lead to a ghost detection, or false detection at device D3 at times. When motion occurs in the region 512, propagation characteristics of both link L1 and link L3 are disturbed. When the location of motion is determined primarily by a magnitude of link disturbance, it is possible that the motion will be deemed close to device D3 due to the magnitude of disturbance of link L3 relative to the disturbance of link L1. However, in the case of motion happening inside the region 512, such a determination would be inaccurate, as the motion may be closer to the device D1 in spatial terms. In the scenario illustrated in FIG. 5A, device D3, can be considered to be 'shadowing' device D1 due to the overlap of the link L1 and the link L3. Since the wireless signals reaching D3, pass in the vicinity of D1, the localization of motion at device D1 is affected. There may be many instances where the motion, though localized proximate to device D1, will be erroneously classified as being proximate to device D3. In various embodiments, the spatial relationships between the devices 508 may be determined in the manner described with respect to FIG. 4B. By integrating the spatial relationships of the devices 508, the relative location of the devices 508 can be incorporated into the localization of motion thereby improving the accuracy of such localization. In this instance device D1 has a lower edge score vs device D3. When the links of both D1 and D3 are excited, the system (being unable to decide between them) will check the inverse edge score of both devices. Since the inverse edge score of D1 will be higher (i.e., it is less towards the edge), than D3, D1 will emerge with a higher probability of motion in its vicinity.

Figure 5B:
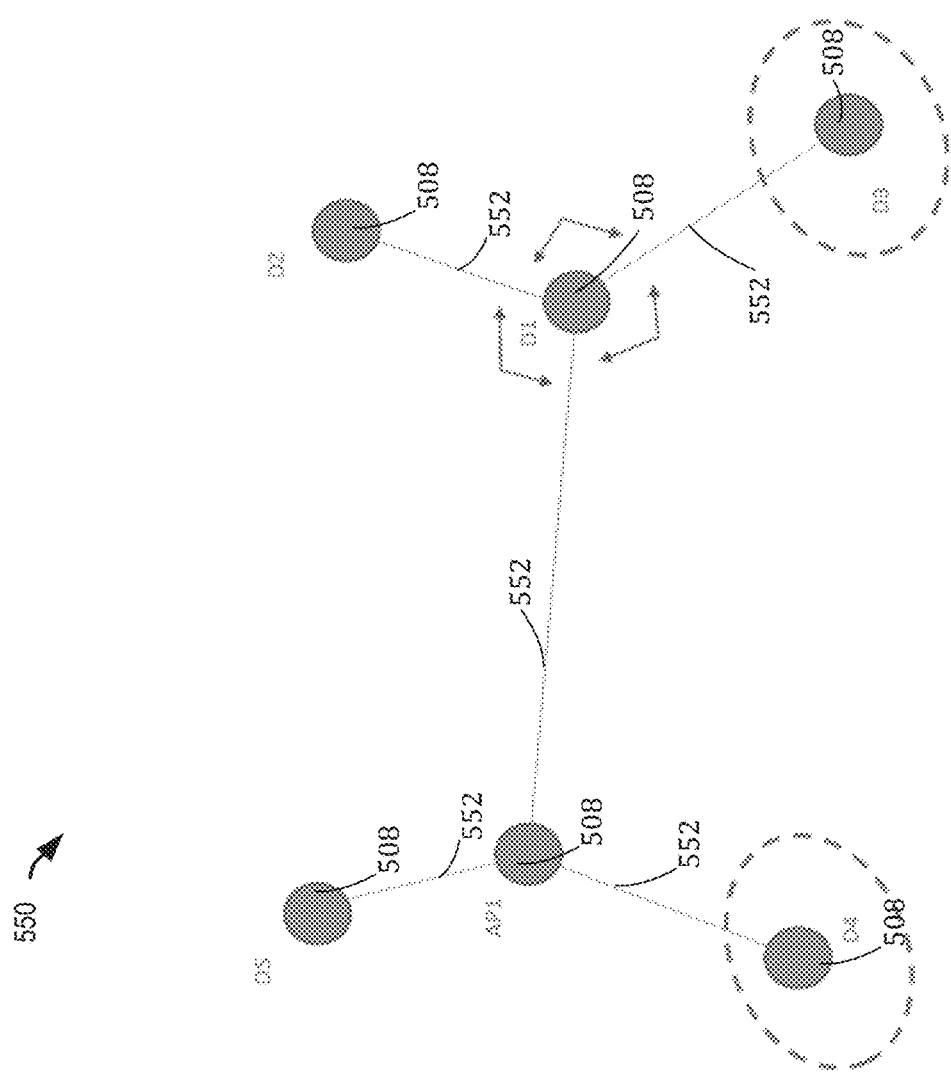
FIG. 5B is a diagram showing an example spanning tree and illustrating determination of connectiveness of nodes.

FIG. 5B is a diagram showing an example spanning tree 550 and illustrating determination of connectiveness of nodes. The example spanning tree 550 may be determined using an optimization process, such as described above in relation to FIG. 3C. The example spanning tree 550 includes spatial paths 552 connecting wireless communication devices 508 (or nodes). Moreover, the wireless communication devices 508 are associated with distances in the two-dimensional coordinate system as described above with respect to FIG. 4B.

Referring again to FIG. 4B, it was disclosed how probabilities can be utilized as proxies for inverse distances, and that the probabilities can be utilized to map each observed pattern (of excited links) into a two-dimensional grid. Once all the wireless communication devices 508 have been mapped onto a cartesian plane, they are connected with the spanning tree 550. The objective of spanning tree 550 is to connect all the wireless communication devices 508 such that the total distance between the wireless communication devices 508 is minimized.

Referring again to FIG. 5A, there is potential for inaccuracy when motion occurs in the region 512 between D1 and D3. This is because both the links L1 and L3 are excited when motion occurs in the region 512. Turning now to FIG. 5B, as illustrated by the spanning tree 550, the device D1 is more central to the space, while device D3 is located towards an extremity of the space. Thus, several other devices are located beyond the location of device D1 while no other devices are located beyond device D3. This relative location of device D1 and device D3 can be used to localize motion occurring, for example, in the region 512.

Referring still to FIG. 5B, the connectivity of the wireless communication devices 508 illustrated in the spanning tree 550 can be used as a proxy for the relative spatial centrality of a particular wireless communication device 508. That is, if a certain wireless communication device 508 is connected to many other devices in the spanning tree 550, it implies that the wireless communication device 508 is more centrally-located than other wireless communication devices. Such a centrally-located device may be, for example, a router, an access point, or a mesh element; however, in other implementations, the centrally located device may be any wireless communication device that is connected to more than one other wireless communication device in a spanning tree. On the other hand, if a wireless communication device 508 is only connected to one other wireless communication device on the spanning tree 550, it is indicative that the wireless communication device 508 is located towards an extremity of the spanning tree 550. This can be computed for any device in the network. Again, this score is computed by not using any of the wireless link connectivity. This is determined by checking the connectivity of the spanning tree. A spanning tree is determined by connecting the cartesian points of the mapped devices, through a minimum spanning tree (i.e., shortest amount of road network required to connect them). Once we have the spanning tree, we can determine the connectivity of devices IN that spanning tree, to come up with their edge scores.

FIG. 5B focuses by way of example on the devices D1 and D3, which are indicated in FIG. 5B by dotted lines. As shown in FIG. 5B, D1 is illustrated as having more connections in the spanning tree 550 than device D3. This signifies that device D1 is more central or anterior to the space, whereas device D3 is more peripheral to the space, since the device D3 only has a single link connecting it in the spanning tree. The inverse of connectivity can be used as an extremity score for each node in the spanning tree 550. For instance, if the degree of connectivity (number of wireless links) is high, for example 3 connections in the case of device D1, then the extremity score (⅓) is lower. In the case of D3, for example, the degree of connectivity is lower (1) hence leading to a higher extremity score of 1 (1/1). The extremity score can, in various embodiments, be indicative of how close a node is to the end points or extremities of a space. Additionally, in various embodiments a distance between a node connected to a low number of links to a next nearest node can be utilized to enhance the extremity score. For example, in the case of device D3, vs device D2, both have a connectivity of 1, (high extremity score); however, device D3 is farther in distance from its next nearest node, than device D2. Hence device D3 is located more on an extremity than device D2. Thus, an extremity score can be modified based on a degree of connectivity and a distance to a next nearest node by using, for example, a linear or nonlinear combination of distance and connectivity.

For clarity, it is noted that the lines in FIG. 5A represent the wireless links. The lines in FIG. 5B do not represent the wireless links. That is why, even though the device is the same in both FIGS. 5A and 5B, the links are not. The links in FIG. 5B are spanning tree links. Spanning tree links are obtained by mapping the devices using a mapping algorithm, and then connecting them by using a spanning tree algorithm. A spanning tree algorithm essentially looks at how to connect these dots on the map, so that the minimum amount of road network is used between them. This kind of algorithm, using a mix of distance based mapping, and using spanning tree on the points, leads to a different kind of connectivity between devices. That is why FIG. 5A and FIG. 5B are different. The spanning tree connectivity tries to capture the edginess of the device, that is whether it lies in the interior, or at the edge of the network.

Figure 6:
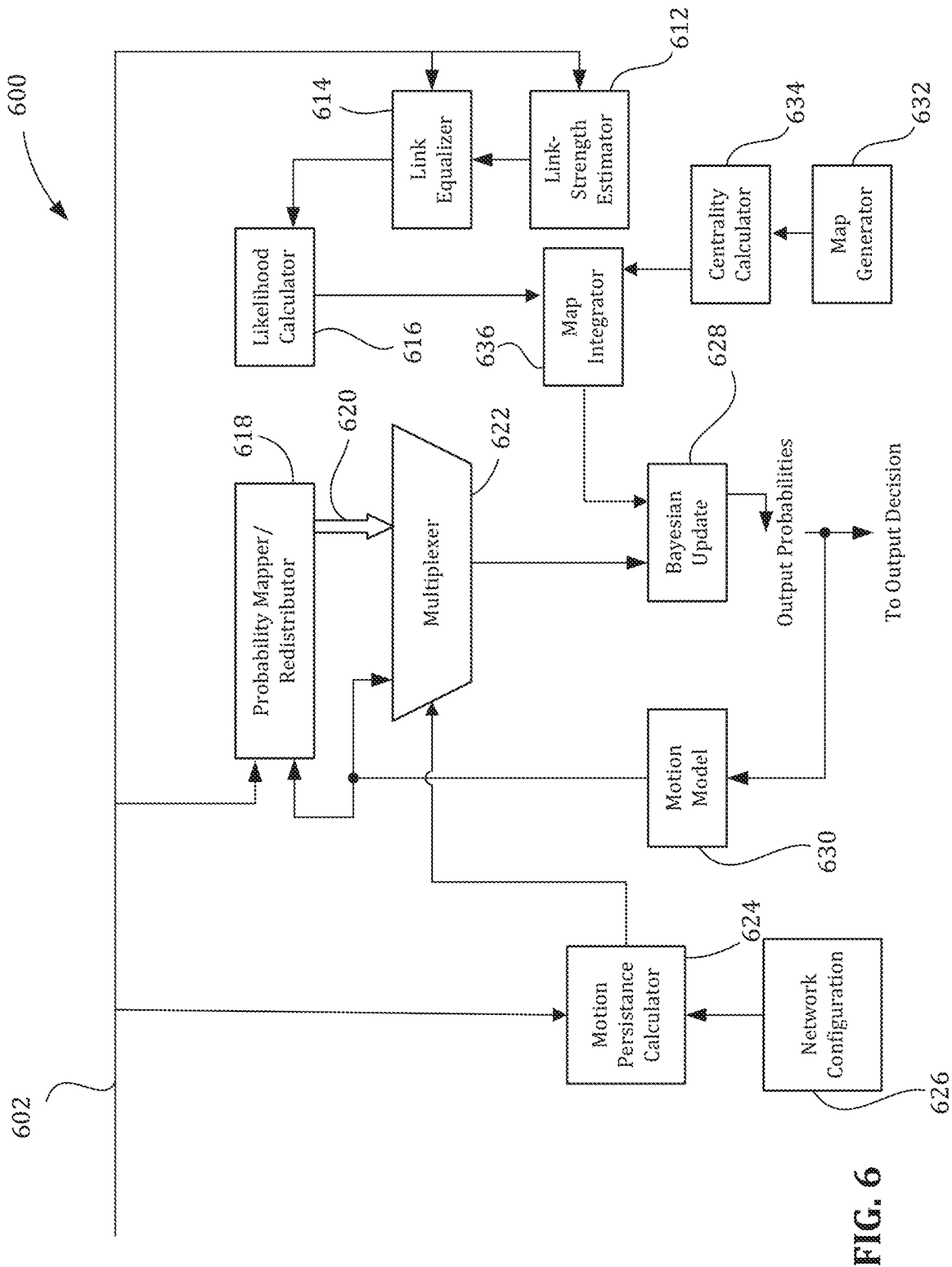
FIG. 6 is a flow chart of an example process for determining a location of motion detected by one or more wireless links in a wireless communication network.

FIG. 6 is a flow chart of an example process 600 for determining a location of motion detected by one or more wireless links in a wireless communication network. The one or more wireless links may be part of a plurality of wireless links defined by respective pairs of wireless nodes, such as the wireless communication devices 404a, 404b, 404c, 404d, 404e, 404f, and 404g of FIGS. 4A-4B. The wireless communication network may include a data processing apparatus (e.g., one or more of the wireless nodes may serve as the data processing apparatus). Alternatively, the data processing apparatus may be communicatively-coupled to the wireless communication network through a data connection (e.g., a wireless connection, a copper-wired connection, a fiber optic connection, etc.). The data processing apparatus may receive a data structure associated with a time frame, as shown by line 602. The data structure 602 may map the plurality of wireless links with their respective motion indicator values for the time frame. The plurality of wireless links may be represented by unique link identifiers in the data structure 602. However, other representations are possible. For example, the plurality of wireless links may be represented by respective pairs of unique node identifiers. In some instances, the data structure 602 may associate each of the unique link identifiers with a corresponding pair of unique node identifiers.

The data processing apparatus executes program instructions to alter one or more magnitudes of the set of motion indicator values to reference each motion indicator value to a common scale of wireless link sensitivity. More specifically, the data processing apparatus may function, in part, as a link strength estimator, such as shown by block 612, and a link equalizer, such as shown by block 614. The link strength estimator 612 and the link equalizer 614 receive an identity of wireless links that are present in the wireless communication network during the time frame as well as their respective motion indicator values. The link equalizer 614 also receives, from the link strength estimator 612, an equalization value for each of the identified wireless links. The link strength estimator 612 and the link equalizer 614 operate cooperatively to reference the motion indicator values of each identified wireless links to a common scale of wireless link sensitivity.

In operation, the link strength estimator 612 estimates a link strength of the identified wireless links by determining a statistical property of their respective motion indicator values. The statistical property may be a maximum motion indicator value, a deviation of a motion indicator value from a mean value, or a standard deviation. Other statistical properties are possible. In some instances, the link strength estimator 612 tracks the statistical properties of one or more respective motion indicator values over successive time frames. The statistical property may allow the link strength estimator 612 to gauge an excitation strength and corresponding dynamic range of a wireless link. Such gauging may account for a unique sensitivity of each identified wireless link. The link strength estimator 612 passes the determined statistical values to the link equalizer 614, which in turn, utilizes them as equalization values for respective motion indicator values. In particular, the link equalizer 614 divides the motion indicator value of each identified wireless link with its respective equalization value (or statistical property) to generate a normalized motion indicator value. In this manner, the link equalizer 614 "equalizes" the identified wireless links so that their respective responses to motion or other events may be compared independent of sensitivity.

For example, due to motion or another event, a first subset of wireless links may become strongly excited and exhibit correspondingly high dynamic ranges (or sensitivities). A second subset of wireless links may become weakly excited and exhibit correspondingly low dynamic ranges (or sensitivities) due to the same motion or event. Such excitations and corresponding dynamic ranges are reflected in the motion indicator values received by the link strength estimator 612 and the link equalizer 614 from the link dictionary 604. However, the link strength estimator 612 and link equalizer 614 operate cooperatively to normalize the received motion indicator values to a common scale of wireless link sensitivity. Such normalization can ensure that comparisons of the first and second sets of wireless links within the plurality of wireless links do not overweight the first set of wireless links relative to the second set. Other benefits of normalization are possible.

The program instructions may further cause the data processing apparatus to identify a subset of wireless links based on a magnitude of their associated motion indicator values relative to the other motion indicator values in the set of motion indicator values. In particular, the data processing apparatus may receive the identified wireless links and their respective normalized motion indicator values from the link equalizer 614 and store this data in a memory associated with a likelihood calculator, such as shown by block 616. As part of this operation, the data processing apparatus may also receive the list of unique wireless nodes and store the list in the memory associated with the likelihood calculator 616. The data processing apparatus may function, in part, as the likelihood calculator 616.

The likelihood calculator 616 identifies a subset of wireless links based on a magnitude of their respective, normalized motion indicator values relative to other normalized motion indicator values. To do so, the likelihood calculator 616 may sort or filter through the normalized motion indicator values received from the link equalizer 614 to identify the subset of wireless links. For example, the likelihood calculator 616 may sort the data structure according to magnitude to determine a highest normalized motion indicator value, thereby generating a subset of wireless links that includes only a single wireless link. In another example, the likelihood calculator 616 may sort the data structure according to magnitude to determine the three highest normalized motion indicator values, thereby generating a subset of wireless links that includes three wireless links. Other numbers of wireless links are possible for the subset of wireless links.

The likelihood calculator 616 also generates count values for the wireless nodes connected to the wireless communication network during the time frame. The count value for each wireless node indicates how many wireless links in the subset of wireless links are defined by the wireless node. For example, and with reference to FIG. 3A, the likelihood calculator 616 may identify a subset of wireless links based on the three highest normalized motion indicator values:

$$\begin{Bmatrix} 0 & 0.00 \\ 1 & 0.00 \\ 2 & 0.24 \\ 3 & 0.36 \\ 4 & 0.40 \\ 5 & 0.65 \end{Bmatrix} \rightarrow \begin{Bmatrix} 3 & 0.36 \\ 4 & 0.40 \\ 5 & 0.65 \end{Bmatrix}$$

The unique link identifiers of 3, 4, and 5 correspond to wireless nodes $N_0$, $N_1$, and $N_2$ as shown below:

$$\begin{Bmatrix} 3 & 0.36 \\ 4 & 0.40 \\ 5 & 0.65 \end{Bmatrix} \rightarrow \begin{Bmatrix} 7f4c9e \rightarrow 7f630c & 0.36 \\ 7f630c \rightarrow 7f4440 & 0.40 \\ 7f630c \rightarrow 7f4c9e & 0.65 \end{Bmatrix} \rightarrow \begin{Bmatrix} N_1 \rightarrow N_2 & 0.36 \\ N_2 \rightarrow N_0 & 0.40 \\ N_2 \rightarrow N_1 & 0.65 \end{Bmatrix}$$

Here, wireless node $N_0$ assists in defining one wireless link in the subset of wireless links, i.e., $N_2 \rightarrow N_0$. Similarly, wireless node $N_1$ assists in defining two wireless links in the subset of wireless links, i.e., $N_1 \rightarrow N_2$ and $N_2 \rightarrow N_1$, and wireless node $N_2$ assists in defining three wireless links in the subset of wireless links, i.e., $N_1 \rightarrow N_2$, $N_2 \rightarrow N_0$, and $N_2 \rightarrow N_1$. Accordingly, the likelihood calculator 616 generates count values of 1, 2, and 3 for respective wireless nodes $N_0$, $N_1$, and $N_2$. In the present example, all wireless nodes of the wireless communication network assist in defining a wireless link of the subset of wireless links. However, for wireless nodes that do not assist in defining a wireless link of the subset of wireless links, the likelihood calculator 616 may generate a count value of zero. In some instances, the likelihood calculator 616 generates a count-value data structure associating each wireless node connected to the wireless communication network during the time frame with its respective count value. For the present example, the likelihood calculator 616 may generate the following count-value data structure:

$$\begin{Bmatrix} N_0 & 1 \\ N_1 & 2 \\ N_2 & 3 \end{Bmatrix}$$

Although wireless nodes in the count-value data structure are represented by the label, $N_i$, where i represents a number of a wireless node, other representations are possible (e.g., pairs of partial MAC addresses).

The likelihood calculator 616 further generates a probability vector that is based on the count values and includes values for each wireless node connected to the wireless communication network during the time frame. The values for each connected wireless node represent a probability of motion at the connected wireless node during the time frame. In particular, the values may represent a probability that motion at (or proximate to) a respective wireless node induces link activity along a particular wireless link. In some instances, the values sum to unity. In these instances, the values may be probability values. The likelihood calculator 616 passes the generated probability vector to a map integrator 636, as shown in FIG. 6.

In some instances, the values for each connected wireless node are likelihood values. The likelihood values may not necessarily sum to unity. The likelihood values may be generated using a link likelihood map that associates likelihood values with respective magnitudes of count values. The likelihood values and their associations may be predetermined and may further be stored in a memory of the likelihood calculator 616 (or data processing apparatus). For example, if a wireless node is strongly represented in a subset of wireless links, motion detected by the wireless communication network will have a relatively high probability of being located at or near the wireless node. As such, the link likelihood map may associate high likelihood values with proportionately high count values. However, other associations of likelihood values and count values are possible.

In some variations, the values for each connected wireless node are probability values in a probability vector, $P(L_j|N_i)$, and the probability values are based on the link likelihood map. The probability values correspond to probabilities that a wireless link, $L_j$, exhibits link activity given motion at a wireless node, $N_i$. For example, and with reference to FIG. 3A, the likelihood calculator 616 may generate a subset of wireless links that includes only wireless link $L_{02}$, which has a unique link identifier of "1". As such, $P(L_j|N_i)=P(1|N_i)=\{P(1|0), P(1|1), P(1|2)\}$. Here, $P(1|0)$ corresponds to the probability that motion at wireless node 0 induces link activity along wireless link 1, $P(1|1)$ corresponds to the probability that motion at wireless node 1 induces link activity along wireless link 1, and $P(1|2)$ corresponds to the probability that motion at wireless node 2 induces link activity along wireless link 1. These probability values can be generated from likelihood values of the link likelihood map. For example, the likelihood calculator 616 may assign wireless nodes 0, 1, and 2 each a likelihood value based on a respective count value. The likelihood calculator 616 may then normalize the assigned likelihood values to unity, thereby generating corresponding probability values for each wireless node.

In operation, a map generator 632 utilizes spatial coordinates of the wireless communication devices to determine the spatial map of the wireless communication devices. In various embodiments, the spatial map may include, for example, the spatial paths connecting the wireless communication devices as well as a spanning tree of the wireless communication devices. In various embodiments, the spatial map is determined according to the process described above, for example, with respect to FIG. 3C, 4A, 4B. The map generator 632 then passes the spatial map to the centrality calculator 634. The centrality calculator 634 determines an extremity score of each wireless communication device. In various embodiments, the extremity score is determined in the manner described with respect to FIG. 5B. The centrality calculator 634 passes the extremity score for each wireless communication device to the map integrator 636. At the map integrator 636, the initial likelihood determined by the likelihood calculator 616 is multiplied by the reciprocal of the extremity score determined by the centrality calculator 634. For example, both device D1 and device D3 were determined by the likelihood calculator 616 to have a likelihood score of 0.9. However, device D1 was determined by the centrality calculator 634 to have an extremity score of ⅓ due to having three links in the spanning tree connected to device D1. In contrast, device D3 was determined by the centrality calculator 634 to have an extremity score of 1 due to there being a single link in the spanning tree connected to device D3. The map integrator 636 multiplies the original likelihoods determined at the likelihood calculator 616 by the reciprocal of the extremity score determined by the centrality calculator 634 to produce modified likelihoods. In the example of device D1 and device D3, the modified likelihood is [D1: 0.9*3, D3: 0.9*1]. From the modified likelihoods, it is observed that the motion-detection system will now be able to break the equivalent initial likelihood determined by the likelihood calculator 616. Even though both device D1 and device D3 had the same original likelihoods as a result of both their links being excited, device D1 has a much greater modified likelihood due to the lower extremity score of device D1. Such a determination allows motion in the region 512 to be localized in the vicinity of device D1. In the case of motion occurring in the vicinity of the device D3, only the link L3 associated with device D3 will be excited. This is due to device D3 being located at an extremity of the structure. Thus, wireless signals that propagate to other devices do not pass through the area occupied by device D3. Hence only one link (of AP-D3) will show motion, and the device D3 will have a much higher likelihood (as compared to AP) and the correct inference will converge to device D3.

Still referring to FIG. 6, the data processing apparatus also executes program instructions to pass, to a probability mapper/redistributor, the list of unique wireless nodes present in the wireless communication network during the time frame. The data processing apparatus may function, in part, as a probability mapper/redistributor, such as shown by block 618. As part of this operation, the data processing apparatus may receive a probability vector generated prior to the time frame, e.g., a prior probability vector. The probability mapper/redistributor 618 is operable to determine a change in wireless connectivity between time frames, such as between a prior time frame and a subsequent time frame. The change in wireless connectivity may include one or both of: [1] wireless nodes that have connected to the wireless communication network between the prior and subsequent time frames, or [2] wireless nodes that have disconnected from the wireless communication network between the prior and subsequent time frames. To determine the change in wireless connectivity, the probability mapper/redistributor 618 may compare the list of unique wireless nodes in the time frame to wireless nodes represented in the probability vector generated prior to the time frame.

The probability mapper/redistributor 618 is also operable to generate an initialization probability vector of a plurality of initialization probability vectors 620 by altering values of the prior probability vector based on the change in wireless connectivity. For example, the change in wireless connectivity may include a wireless node that has disconnected from the wireless communication network between the prior and subsequent time frames. In this case, the probability mapper/redistributor 618 may generate the initialization probability vector by apportioning values of the prior probability vector associated with the disconnected wireless node to values of wireless nodes that have remained connected to the wireless communication network. Such apportioning may occur in ratios defined by the values of the remaining wireless nodes. However, other apportioning schedules are possible. In another example, the change in wireless connectivity may include a wireless node that has connected from the wireless communication network between the prior and subsequent time frames. In this case, the probability mapper/redistributor 618 generates the initialization probability vector by adding a value to the prior probability vector for the newly-connected wireless node.

The probability mapper/redistributor 618 may be operable to generate other types of initialization probability vectors that correspond to reset states. For example, if the wireless communication network (or motion detection system) is cold-started, the probability mapper/redistributor 618 may generate an initialization probability vector by assigning equal probability values to all unique wireless nodes. In another example, if the wireless communication network (or motion detection system) is warm-started, the probability mapper/redistributor 618 may generate an initialization probability vector based on probability values that correspond to a time frame when motion was last detected. In yet another example, if the wireless communication network (or motion detection system) is operational but later reset, the probability mapper/redistributor 618 may utilize the prior probability vector as the initialization probability vector. In yet another example, if a user notifies the wireless communication network (or motion detection system) that he/she is leaving a monitored residence (e.g., through a mobile software application), the probability mapper/redistributor 618 may generate an initialization probability vector with probability values biased towards wireless nodes at a point of entry (e.g., a front door).

The probability mapper/redistributor 618 passes the plurality of initialization probability vectors 620 to a multiplexor (or mux), which also receives the prior probability vector from a motion model. The data processing apparatus may function, in part, as the multiplexor, such as shown by block 622. The multiplexor 622 is operable to select the prior probability vector or one of the plurality of initialization probability vectors based on the set of motion indicator values, a configuration of the wireless communication network, or both. The selected probability vector is then passed to the Bayesian update engine 628, as shown in FIG. 6. In order to determine which probability vector to select, the multiplexor 622 receives a control input from a motion persistence calculator, as shown by block 624. The motion persistence calculator 624 receives the data structure 602, which includes the set of motion indicator values, and also receives a configuration of the wireless communication network 626. Based on these inputs, the motion persistence calculator 624 generates the control signal, which when received by the multiplexor 622, selects which of the prior probability vector or one of the plurality of initialization probability vectors is passed to the Bayesian update engine 628. If motion is continuously detected by the wireless communication network (or motion detection system), the motion persistence calculator 624 may keep passing a prior probability vector through the multiplexor 622. In contrast, if motion is detected after a period of absence, the motion persistence calculator 624 may pass an initialization probability vector through the multiplexor 622 that corresponds to a reset state. The data processing apparatus may also function, in part, as the motion persistence calculator 624.

In some implementations, the data processing apparatus uses the selected probability vector and a set of motion indicator values associated with a second subsequent time frame to identify a location associated with motion that occurred during the subsequent time frame. In particular, the data processing apparatus executes program instructions to generate, from a first probability vector received from the map integrator 636 and a second probability vector received from the multiplexor 622, a third probability vector that includes third values for each wireless node. In particular, the Bayesian update engine generates the third probability vector, as shown by block 628. The third values of the third probability vector represent probabilities of motion at the respective wireless nodes during the time frame.

In some variations, the second probability vector is represented by a probability vector, $P(N_i)$, that includes probability values (or second values) representing a probability of motion at a wireless node, $N_i$. The probability of motion at wireless node, $N_i$, for $P(N_i)$ is independent of link activity along any of wireless links, $L_j$, and may also be independent of other factors. For example, and with reference to FIG. 3A, the program instructions may cause the data processing apparatus to define $P(N_i)$ according to $P(N_i)=\{P(0), P(1), P(2)\}$. Here, $P(N_i)$ has probability values of $P(0)$, $P(1)$, and $P(2)$, which correspond to the probability of motion at (or proximate to) wireless nodes 0, 1, and 2, respectively.

In some variations, the third probability vector is represented by $P(N_i|L_j)$, where $N_i$ corresponds to the unique node identifier and $L_j$ corresponds to the unique link identifier. The third probability vector, $P(N_i|L_j)$, includes third values that represent a probability of motion at wireless node, $N_i$, given link activity along wireless link, $L_j$. For example, if $L_j$ corresponds to wireless link 1 in the wireless communication network 300 of FIG. 3A, the respective third values may then be represented by $P(0|1)$, $P(1|1)$, and $P(2|1)$, where $P(N_i|1)=\{P(0|1), P(1|1), P(2|1)\}$. Here, $P(0|1)$ corresponds to a probability that link activity along wireless link 1 results from motion at wireless node 0, $P(1|1)$ corresponds to a probability that link activity along wireless link 1 results from motion at wireless node 1, and $P(2|1)$ corresponds to a probability that link activity along wireless link 1 results from motion at wireless node 2.

The third probability vector, $P(N_i|L_j)$, may be determined by the Bayesian update engine 628 according to Eq. (1):

$$P(N_i|L_j) = \frac{P(L_j|N_i) \cdot P(N_i)}{\sum_k P(L_j|N_i)P(N_i)}$$

where $P(L_j|N_i)$ and $P(N_i)$ are as described above for, respectively, the first probability vector from the map integrator 636 and the second probability vector from the multiplexor 622. Eq. (1) may allow the localization process to determine the location of detected motion using Bayesian statistics. For example, if in the wireless communication network 300 of FIG. 3A, the subset of wireless links includes only wireless link 1 and $P(1|N_i)=\{1, 0.2, 0.9\}$ based on the link likelihood map, the program instructions may then cause the data processing apparatus to calculate the third probability vector, $P(N_i|1)$, according to:

$$P(N_i|1) = \frac{P(1|N_i) \cdot P(N_i)}{\sum_k P(1|N_i)P(N_i)} = \frac{\{1.0 \cdot 0.333, 0.2 \cdot 0.333, 0.9 \cdot 0.333\}}{(1.0 \cdot 0.333) + (0.2 \cdot 0.333) + (0.9 \cdot 0.333)}$$

Such calculation results in $P(N_i|1)=\{0.476, 0.095, 0.429\}$, with the third values summing to unity, i.e., 0.476+0.095+0.429=1. $P(N_i|1)$ may therefore represent a probability distribution normalized to unity. In $P(N_i|1)$, $P(0|1)$ corresponds to the largest of the third values, indicating that motion detected along wireless link 1 has the highest probability of being located at (or proximate to) wireless node 0. Based on this value of $P(0|1)$, the program instructions may cause the data processing apparatus to look up the MAC address value of wireless node 0, and when found, output the result (e.g., output 7f4440).

In some implementations, the data processing apparatus performs an iterative process for sequential time frames. For example, the data processing apparatus may repeat the operations, over multiple iterations for respective time frames, of obtaining the set of motion indicator values associated with a subsequent time frame, identifying the subset of wireless links based on a magnitude of their associated motion indicator values relative to other motion indicator values in the set of motion indicator values, generating the count values for the wireless nodes connected to the wireless communication network during the subsequent time frame, generating the first probability vector based on the count values and including values for the connected wireless nodes. In some implementations, the repeated operations include obtaining a set of motion indicator values associated with a prior time frame, generating a prior probability vector associated with the prior time frame, generating a second probability vector by selecting the prior probability vector or one of the plurality of initialization probability vectors to.

In some implementations, the repeated operations may include generating a third probability vector based on the first values of the first probability vector and the second values of the second probability vector; identifying a wireless communication device associated with the highest of the third values; and identifying, by operation of a data processing apparatus, a location associated with the identified wireless communication device as a location of the motion detected from the wireless signals exchanged during the subsequent time frame.

An output of the Bayesian update engine 628 may be fed into the motion model to generate the prior probability vector (or second probability vector), which is passed to the probability mapper/redistributor 618 and the multiplexor 622. The data processing apparatus may function, in part, as the motion model, as shown by block 630. The motion model 630 may operate analogous to calculating probabilities on a trellis.

An output of the Bayesian update engine 628 may also be used to generate an output of the localization process for a given time frame. For example, the wireless communication device assigned the highest probability value in the probability vector generated by the Bayesian update engine 628 may be interpreted as the location of motion that was detected by the motion detection system. An identification of the wireless node (or a location, name, MAC address, or other information of the wireless node) may be provided to a user device (e.g., in a notification) or provided to another system (e.g., a smart home system, a security system, etc.) that can take appropriate action.

Figure 7:
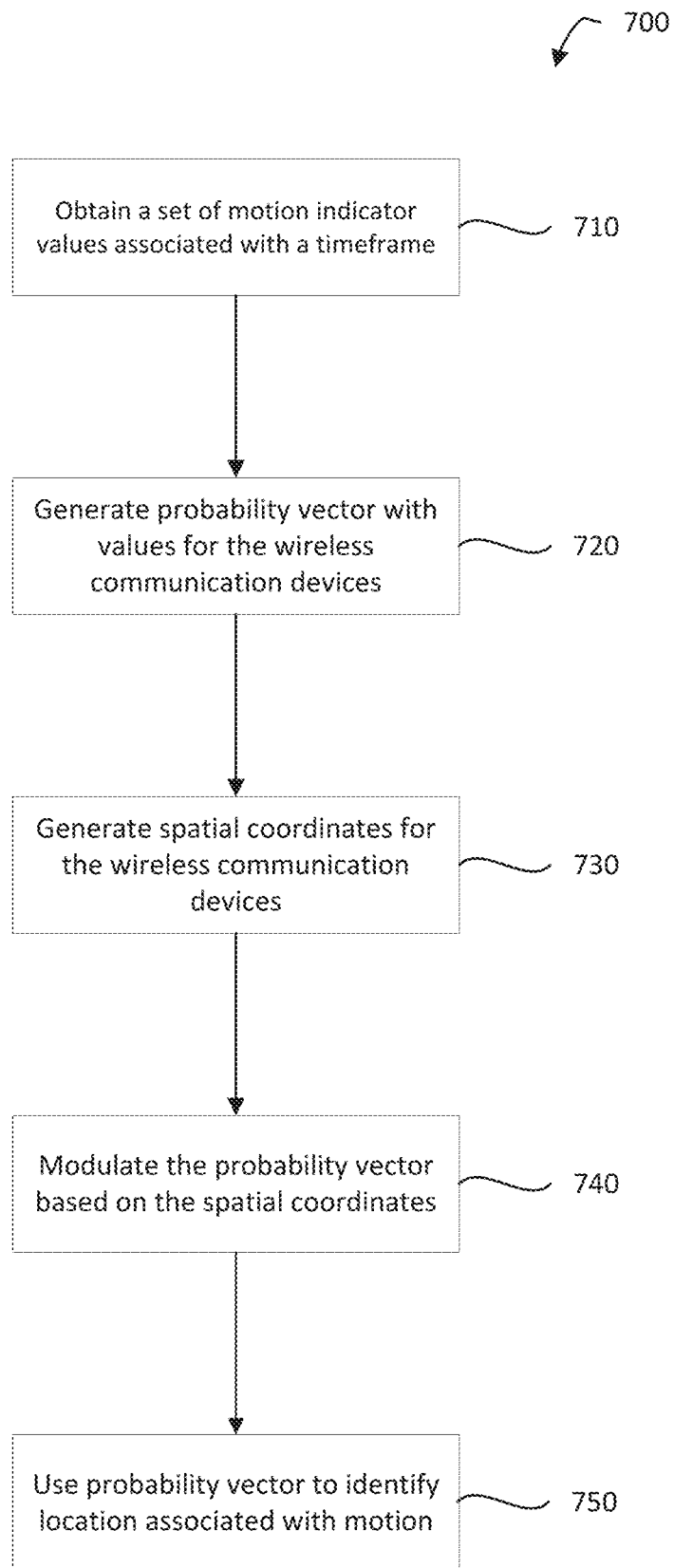
FIG. 7 is a flow chart showing an example process performed, for example, by a motion detection system.

FIG. 7 is a flow chart showing an example process 700 performed, for example, by a motion detection system. Operations in the example process 700 may be performed by a data processing apparatus (e.g., a processor in a wireless communication device 102 in FIG. 1A) to detect a location of motion based on signals received at wireless communication devices. The example process 700 may be performed by another type of device. For instance, operations of the process 700 may be performed by a system other than a wireless communication device (e.g., a computer system connected to the wireless communication system 100 of FIG. 1A that aggregates and analyzes signals received by the wireless communication devices 102). The motion detection system can process information based on wireless signals transmitted (e.g., on wireless links between wireless communication devices) through a space to detect motion of objects in the space (e.g., as described with respect to FIGS. 1 and 2A, 2B, 2C, or otherwise). Operations of the example process 700 may be performed by a remote computer system (e.g., a server in the cloud), a wireless communication device (e.g., one or more of the wireless communication devices), or another type of system. For example, one or more of the operations in the example process 700 may be performed by one or more of the example wireless communication devices 102A, 102B, 102C in FIG. 1, client devices 232 or the APs 226, 228 in FIG. 2C, the wireless communication devices 404a, 404b, 404c, 404d, 404e, 404f, and 404g of FIG. 4A-4B, or by a cloud-based computer system The example process 700 may include additional or different operations, and the operations may be performed in the order shown or in another order. In some cases, one or more of the operations shown in FIG. 7 are implemented as processes that include multiple operations, sub-processes, or other types of routines. In some cases, operations can be combined, performed in another order, performed in parallel, iterated or otherwise repeated, or performed another manner.

At 710, a set of motion indicator values associated with a time frame is obtained. The set of motion indicator values indicate motion detected from wireless links in a wireless communication network during the time frame. Each motion indicator value is associated with a respective wireless link and each wireless link is defined between a respective pair of wireless communication devices in the wireless communication network. In various embodiments, the wireless communication network may be, for example, the wireless communication network 502 illustrated in FIG. 5B. The wireless links may be, for example, the wireless links 510 illustrated in FIG. 5B, and the wireless communication devices may be the wireless communication devices 508 illustrated in FIG. 5b.

At 720, a probability vector is generated that includes values for the connected wireless communication devices. The value for each connected wireless communication device represents a probability of motion at the connected wireless communication device during the time frame. In various embodiments, the probability vector is generated, for example, by the likelihood calculator 616 illustrated in FIG. 6. In some implementations, generating the probability vector includes identifying a subset of the wireless links based on a magnitude of their respective motion indicator values relative to other motion indicator values in the set of motion indicator values.

In some implementations, generating the probability vector includes generating count values for the wireless communication devices connected to the wireless communication network during the time frame. In some implementations, the count value for each wireless communication device indicates how many wireless links in the identified subset are defined by the wireless communication device. In some implementations, the probability vector is based on the count values.

At 730, spatial coordinates are generated for respective wireless communication devices. The spatial coordinates for each wireless communication device represent a location of the wireless communication device in space. In the example illustrated in FIG. 6, the map generator 632 utilizes spatial coordinates of the wireless communication devices to determine the spatial map of the wireless communication devices. In various embodiments, the spatial map may include, for example, the spatial paths connecting the wireless communication devices as well as a spanning tree of the wireless communication devices. In some implementations, the process 700 includes determining, based on the spatial coordinates, a number of spatial paths between wireless communication devices. In some implementations, the spatial paths are identified by generating a spanning tree from the spatial coordinates.

In some implementations, the process 700 includes determining an extremity score for each of the wireless communication devices based on the spatial coordinates for the wireless communication devices. For instance, the extremity score for a wireless communication device can be calculated based on the wireless communication device's degree of connectivity in the wireless communication network, the wireless communication device's distance to other devices in the wireless communication network, or a combination of these and other factors. A higher degree of connectivity can result in a lower extremity score, whereas a higher distance to neighboring devices can result in a higher extremity score. In the example of FIG. 6, the centrality calculator 634 determines the extremity score of each wireless communication device. The connectivity of each wireless communication device, the distances between the wireless communication devices and potentially other factors for the extremity score can be calculated (e.g., by the centrality calculator 634) based on the spatial map, the spanning tree, or another type of data structure that includes or represents the spatial coordinates of the wireless communication devices.

At 740, the probability vector is modified based on the spatial coordinates of the wireless communication devices to generate a modified probability vector. In the example illustrated in FIG. 6, the probability vector is modified by the map integrator 636 based on the extremity scores generated by the centrality calculator 634. The modified probability vector represents a modified probability of motion at the connected wireless communication device during the time frame. In some implementations, modifying the probability vector includes multiplying the probability value for each device by the reciprocal of the extremity score for that device. In some cases, the probability values may be modified in another manner (e.g., based on additional or different factors) to generate the modified probability vector.

From the modified likelihoods, the motion detection system can distinguish equivalent initial likelihood determined by the likelihood calculator 616 of FIG. 6. In the example of device D1 and device D3 shown in FIG. 5A, even though both device D1 and device D3 had the same original likelihoods as a result of both their links being excited, device D1 has a greater modified likelihood due to the lower extremity score of device D1. Such a determination allows motion in the region 512 of FIG. 5A to be localized in the vicinity of device D1. In the case of motion occurring in the vicinity of the device D3, only the link L3 associated with device D3 will be excited. This is due to device D3 being located at an extremity of the structure. Thus, wireless signals going to other devices do not pass through the area occupied by device D3. Hence only one link (of AP-D3) will show motion, and the device D3 will have much higher likelihood (as compared to AP) and the correct inference will converge to device D3.

At 750, the modified probability vector is used to identify a location associated with motion that occurred in the space during the time frame. For example, the Bayesian update engine 628 may use the modified probability vector (from 740) along with a prior probability vector to generate an output probability vector as described with respect to FIG. 6. The wireless communication device associated with the highest probability value in the output probability vector may be identified as the location of the motion that occurred.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

Some of the operations described in this specification can be implemented as operations performed by a data processing apparatus on data stored on one or more computer-readable storage devices or received from other sources.

The term "data-processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to, and receiving documents from, a device that is used by the user; for example, by sending web pages to a web browser on a user's client device in response to requests received from the web browser.

In a general aspect, the systems and techniques described here allow for utilizing spatial maps to improve localization of detected motion.

In a first example, a method includes obtaining a set of motion indicator values associated with a time frame. The set of motion indicator values indicate motion detected from wireless links in a wireless communication network during the time frame. Each motion indicator value is associated with a respective wireless link. Each wireless link is defined between a respective pair of wireless communication devices in the wireless communication network. The method also includes generating a probability vector comprising values for the connected wireless communication devices. The value for each connected wireless communication device represents a probability of motion at the connected wireless communication device during the time frame.

The method also includes generating spatial coordinates for respective wireless communication devices. The spatial coordinates for each wireless communication device represent a location of the wireless communication device in space. The method also includes modifying the probability vector based on the spatial coordinates of each wireless communication device to generate a modified probability vector representing a probability of motion at the connected wireless communication device during the time frame. The method also includes using the modified probability vector to localize motion relative to the wireless communication device during the time frame.

Implementations of the first example may include one or more of the following features. For example, generating a spanning tree from the spatial coordinates and determining a degree of connectivity of each wireless communication device according to the spanning tree. In this example, generating the modified probability vector includes multiplying each of the probability values based on the degree of connectivity of each wireless communication device. Further, in this example, generating the modified probability vector may include multiplying each of the probability values by the reciprocal of the degree of connectivity of each wireless communication device.

Implementations of the first example may include determining distances between pairs of the wireless communication devices based on the spatial coordinates. In such implementations, one or more of the probability values may be increased or decreased based on one or more of the distances.

Implementations of the first example may include one or more of the following features. For example, identifying a subset of the wireless links based on a magnitude of their respective motion indicator values in the set of motion indicator values and generating count values for the wireless communication devices connected to the wireless communication network during the time frame. The count value for each wireless communication device indicates how many wireless links in the identified subset are defined by the wireless communication device. The probability vector is generated based on the count values. Further implementations of the first example may include generating spatial coordinates for the respective wireless communication devices comprises generating spatial coordinates for each MAC address in the wireless communication network. In further implementations of the first example, spatial coordinates are generated for a two-dimensional coordinate system and the graphical representation of the spatial arrangement includes a two-dimensional map of the wireless communication devices.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A method comprising:
obtaining motion indicator values associated with a time frame, the motion indicator values indicating motion detected based on wireless signals communicated on wireless links in a wireless communication network during the time frame, the motion indicator values associated the wireless links, each of the wireless links defined between a respective pair of wireless communication devices in the wireless communication network;

based on the motion indicator values, generating a probability vector comprising probability values for the wireless communication devices, the probability value for each wireless communication device representing a probability of motion at the wireless communication device during the time frame;

generating spatial coordinates for at least one of the wireless communication devices, the spatial coordinates for each wireless communication device representing a location of the wireless communication device in a space;

based on the spatial coordinates, generating a modified probability vector by modifying one or more of the probability values, the modified probability vector representing a modified probability of motion in a vicinity of the wireless communication device during the time frame; and using the modified probability vector to identify a location associated with motion that occurred in the space during the time frame.

2. The method of claim 1, comprising:
generating a spanning tree from the spatial coordinates; and
determining a degree of connectivity of at least a subset of the wireless communication device according to the spanning tree;

wherein generating the modified probability vector comprises modifying each of the probability values based on the degree of connectivity of each wireless communication device.

3. The method of claim 2, wherein generating the modified probability vector comprises multiplying each of the probability values by the degree of connectivity of each wireless communication device.

4. The method of claim 1, comprising determining distances between pairs of the wireless communication devices based on the spatial coordinates, wherein generating the modified probability vector comprises increasing or decreasing one or more of the probability values based on one or more of the distances.

5. The method of claim 1, comprising:
determining extremity scores for the respective wireless communication devices based on the spatial coordinates; and
generating the modified probability vector by modifying the probability values based on the extremity scores of the respective wireless communication devices.

6. The method of claim 1, wherein generating the probability vector comprises:
identifying a subset of the wireless links based on a magnitude of their respective motion indicator values relative to other motion indicator values in the set of motion indicator values;
generating count values for at least a subset of the wireless communication devices connected to the wireless communication network during the time frame, wherein the count value for each wireless communication device indicates how many wireless links in the identified subset are defined by the wireless communication device; and
generating the probability vector based on the count values.

7. The method of claim 1, wherein generating spatial coordinates for the respective wireless communication devices comprises generating spatial coordinates representing each MAC address in the wireless communication network.

8. The method of claim 1, wherein the spatial coordinates are generated for a two-dimensional coordinate system, and the graphical representation of the spatial arrangement comprises a two-dimensional map of the wireless-communication devices.

9. The method of claim 1, wherein obtaining motion indicator values comprises detecting a change in channel responses derived from the wireless signals.

10. The method of claim 9, wherein the channel responses comprise complex values of frequency components of respective wireless signals.

11. A system comprising:
a plurality of wireless communication devices in a wireless communication network;
a computer device comprising one or more processors operable to perform one or more operations comprising:
obtaining motion indicator values associated with a time frame, the motion indicator values indicating motion detected based on wireless signals communicated on wireless links in a wireless communication network during the time frame, the motion indicator values associated with the wireless links, each of the wireless links defined between a respective pair of wireless communication devices in the wireless communication network;
based on the motion indicator values, generating a probability vector comprising probability values for the wireless communication devices, the probability value for each wireless communication device representing a probability of motion at the wireless communication device during the time frame;
generating spatial coordinates for at least one of the wireless communication devices, the spatial coordinates for each wireless communication device representing a location of the wireless communication device in a space;
based on the spatial coordinates, generating a modified probability vector by modifying one or more of the probability values, the modified probability vector representing a modified probability of motion at the wireless communication device during the time frame; and
using the modified probability vector to identify a location associated with motion that occurred in the space during the time frame.

12. The system of claim 11, comprising:
generating a spanning tree from the spatial coordinates; and
determining a degree of connectivity of at least a subset of the wireless communication device according to the spanning tree;
wherein generating the modified probability vector comprises modifying each of the probability values based on the degree of connectivity of each wireless communication device.

13. The system of claim 12, wherein generating the modified probability vector comprises multiplying each of the probability values by the degree of connectivity of each wireless communication device.

14. The system of claim 11, comprising determining distances between pairs of the wireless communication devices based on the spatial coordinates, wherein generating the modified probability vector comprises increasing or decreasing one or more of the probability values based on one or more of the distances.

15. The system of claim 11, comprising:
determining extremity scores for the respective wireless communication devices based on the spatial coordinates; and
generating the modified probability vector by modifying the probability values based on the extremity scores of the respective wireless communication devices.

16. The system of claim 11, wherein generating the probability vector comprises:
identifying a subset of the wireless links based on a magnitude of their respective motion indicator values relative to other motion indicator values in the set of motion indicator values;
generating count values for at least a subset of the wireless communication devices connected to the wireless communication network during the time frame, wherein the count value for each wireless communication device indicates how many wireless links in the identified subset are defined by the wireless communication device; and
generating the probability vector based on the count values.

17. The system of claim 11, wherein generating spatial coordinates for the respective wireless communication devices comprises generating spatial coordinates representing each MAC address in the wireless communication network.

18. The system of claim 11, wherein the spatial coordinates are generated for a two-dimensional coordinate system, and the graphical representation of the spatial arrangement comprises a two-dimensional map of the wireless-communication devices.

19. The system of claim 11, wherein obtaining motion indicator values comprises detecting a change in channel responses derived from the wireless signals.

20. The system of claim 19, wherein the channel responses comprise complex values of frequency components of respective wireless signals.

21. A non-transitory computer-readable medium comprising instructions that are operable, when executed by a data processing apparatus, to perform operations comprising:

obtaining motion indicator values associated with a time frame, the motion indicator values indicating motion detected based on wireless signals communicated on wireless links in a wireless communication network during the time frame, the motion indicator values associated with the wireless links, each of the wireless links defined between a respective pair of wireless communication devices in the wireless communication network;

based on the motion indicator values, generating a probability vector comprising probability values for the wireless communication devices, the probability value for each wireless communication device representing a probability of motion at the wireless communication device during the time frame;

generating spatial coordinates for at least one of the respective wireless communication devices, the spatial coordinates for each wireless communication device representing a location of the wireless communication device in a space;

based on the spatial coordinates, generating a modified probability vector by modifying one or more of the probability values, the modified probability vector representing a modified probability of motion at the wireless communication device during the time frame; and using the modified probability vector to identify a location associated with motion that occurred in the space during the time frame.

\* \* \* \* \*

UNITED STATES PATENT AND TRADEMARK OFFICE
CERTIFICATE OF CORRECTION

PATENT NO. : 12,449,529 B2
APPLICATION NO. : 18/315769
DATED : October 21, 2025
INVENTOR(S) : Mohammad Omer It is certified that error appears in the above-identified patent and that said Letters Patent is hereby corrected as shown below:

In the Specification

Column 7, Detailed Description, Line 57 Delete "100." and insert -- 110. -- therefor Column 8, Detailed Description, Line 67 Delete "(to)" and insert -- ($t_0$) -- therefor Column 9, Detailed Description, Line 11 Delete "to" and insert -- $t_0$ -- therefor Column 9, Detailed Description, Line 14 Delete "to" and insert -- $t_0$ -- therefor Column 9, Detailed Description, Line 38 Delete "to" and insert -- $t_0$ -- therefor Column 13, Detailed Description, Line 2 Delete "@n)." and insert -- $\omega_n$). -- therefor Column 13, Detailed Description, Line 3 Delete "@n," and insert -- $\omega_n$, -- therefor Column 13, Detailed Description, Line 11 Delete "@n" and insert -- $\omega_n$ -- therefor Column 13, Detailed Description, Line 12 Delete "@n." and insert -- $\omega_n$. -- therefor Column 14, Detailed Description, Line 41 Delete "No" and insert -- $N_0$ -- therefor Column 19, Detailed Description, Line 47 Delete "x," and insert -- , -- therefor Column 19, Detailed Description, Line 50 Delete "$d_p^{12}$," and insert -- $d_x^{12}$, -- therefor Column 26, Detailed Description, Line 14 Delete "No," and insert -- $N_0$, -- therefor Signed and Sealed this
Thirtieth Day of December, 2025

John A. Squires
*Director of the United States Patent and Trademark Office*